United States Patent
Kihara et al.

(10) Patent No.: US 10,558,726 B2
(45) Date of Patent: Feb. 11, 2020

(54) METHOD AND APPARATUS FOR EXECUTING APPLICATION

(71) Applicant: FUJITSU LIMITED, Kawasaki-shi, Kanagawa (JP)

(72) Inventors: Hideto Kihara, Kawasaki (JP); Naoki Nishiguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 2 days.

(21) Appl. No.: 15/458,063

(22) Filed: Mar. 14, 2017

(65) Prior Publication Data
US 2017/0286559 A1    Oct. 5, 2017

(30) Foreign Application Priority Data
Mar. 29, 2016    (JP) .................. 2016-066155

(51) Int. Cl.
*G06F 16/95* (2019.01)
*G06F 16/955* (2019.01)
*G06F 16/958* (2019.01)
*G06F 9/445* (2018.01)
*G06F 9/54* (2006.01)

(52) U.S. Cl.
CPC .......... *G06F 16/9566* (2019.01); *G06F 9/445* (2013.01); *G06F 9/547* (2013.01); *G06F 16/986* (2019.01)

(58) Field of Classification Search
CPC .... G06F 16/986; G06F 9/547; G06F 16/9566; G06F 9/445
See application file for complete search history.

(56) References Cited

U.S. PATENT DOCUMENTS

| | | | |
|---|---|---|---|
| 2003/0231657 A1* | 12/2003 | Poon | H04L 29/06 370/469 |
| 2005/0120054 A1* | 6/2005 | Shulman | G06F 17/30306 |
| 2005/0144290 A1* | 6/2005 | Mallal | H04L 29/06 709/227 |
| 2006/0064399 A1* | 3/2006 | De Sio | G06F 16/958 |
| 2006/0277196 A1* | 12/2006 | Oosawa | G06F 17/30887 |
| 2007/0027950 A1* | 2/2007 | Mori | H04L 67/02 709/203 |

(Continued)

FOREIGN PATENT DOCUMENTS

| | | |
|---|---|---|
| JP | 2001-051839 | 2/2001 |
| JP | 2001-051839 A | 2/2001 |

(Continued)

OTHER PUBLICATIONS

JPOA—Office Action dated Nov. 5, 2019 for Japanese Patent Application No. 2016-066155, with machine English translation.

*Primary Examiner* — Tuan C Dao
(74) *Attorney, Agent, or Firm* — Fujitsu Patent Center

(57) ABSTRACT

A disclosed information processing apparatus includes a memory and a processor coupled to the memory. The processor is configured to: instruct a browser engine to load an application based on a virtual URL corresponding to a path of a storage location of the application, the application being stored in a storage unit and to be executed by the browser engine; and provide, to the browser engine, the application identified by the path corresponding to the virtual URL, when receiving, from the browser engine, a request to obtain data using the virtual URL as a proxy.

6 Claims, 25 Drawing Sheets

(56) References Cited

U.S. PATENT DOCUMENTS

| | | | |
|---|---|---|---|
| 2007/0204003 A1* | 8/2007 | Abramson | H04L 67/06 |
| | | | 709/217 |
| 2007/0282965 A1 | 12/2007 | Kataoka | |
| 2011/0066681 A1 | 3/2011 | Shiota et al. | |
| 2013/0179876 A1* | 7/2013 | Aliminati | H04L 41/0893 |
| | | | 717/177 |
| 2015/0100626 A1 | 4/2015 | Noda et al. | |
| 2015/0281343 A1 | 10/2015 | Yamashita et al. | |

FOREIGN PATENT DOCUMENTS

| | | |
|---|---|---|
| JP | 2007-323115 A | 12/2007 |
| JP | 2007-336335 A | 12/2007 |
| JP | 2013-137748 | 7/2013 |
| JP | 2015-075901 A | 4/2015 |
| JP | 2015-197743 A | 11/2015 |
| WO | 2009/139437 A1 | 11/2009 |

\* cited by examiner

| APPLICATION ID | DELIVERY SOURCE URL |
|---|---|
| ap1 | http://aplstore1.com/app1.zip |
| ap2 | http://aplstore2.com/app2.zip |
| ap3 | http://aplstore3.com/app3.zip |
| ⋮ | ⋮ |

| APPLICATION ID | VIRTUAL URL |
|---|---|
| ap1 | http://0.0.0.0:10001/app1/ |
| ap2 | http://0.0.0.0:10002/app2/ |
| ap3 | http://0.0.0.0:10003/app3/ |
| ⋮ | ⋮ |

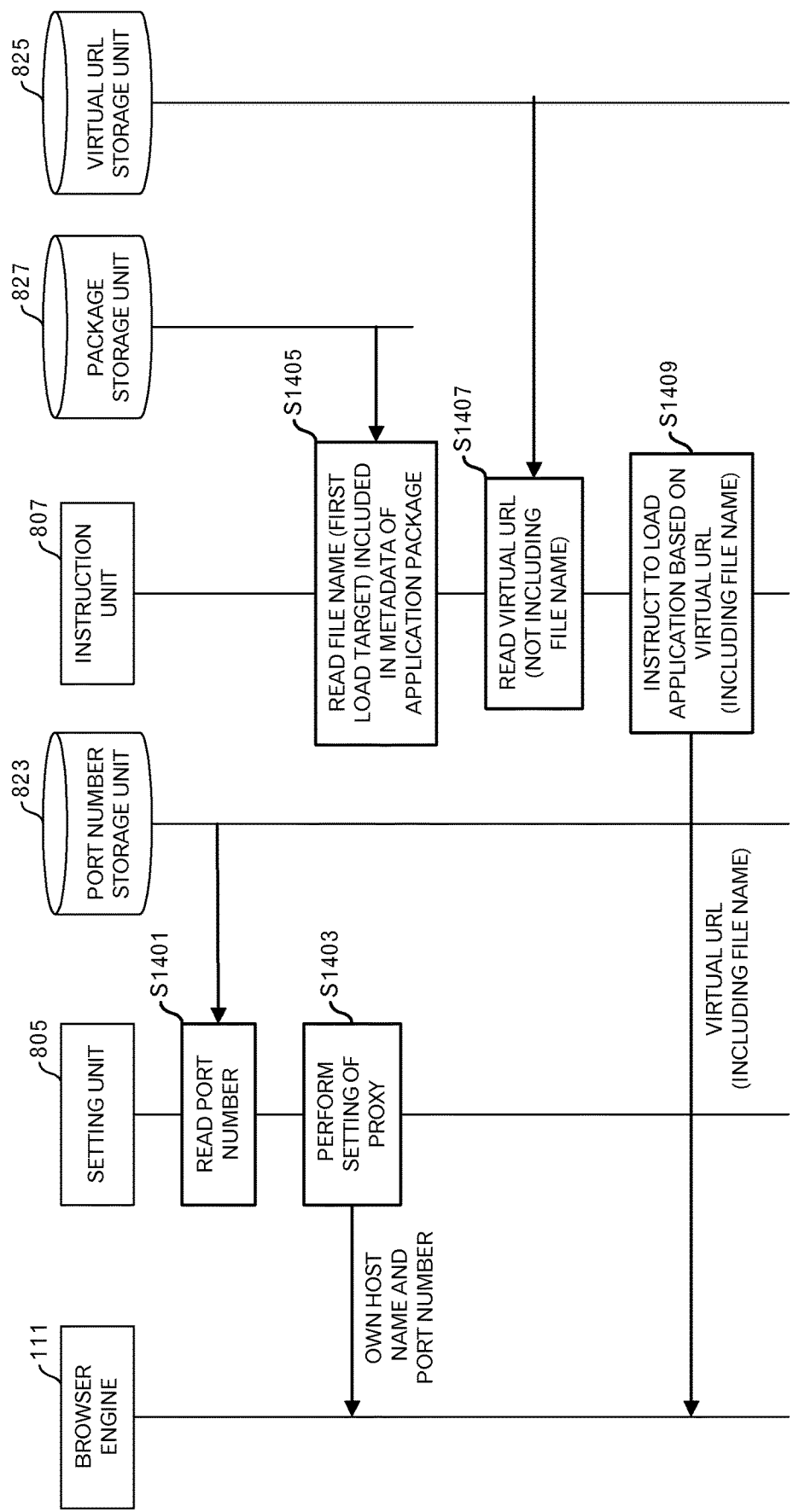

| APPLICATION ID | VIRTUAL URL |
|---|---|
| ap1 | http://127.0.0.1:10000/app1/ |
| ap2 | http://127.0.0.2:10000/app2/ |
| ap3 | http://127.0.0.3:10000/app3/ |
| ⋮ | ⋮ |

| APPLICATION ID | VIRTUAL URL | GROUP KEY |
|---|---|---|
| ap1 | http://0.0.0.0:10001/app1/ | g1 |
| ap2 | http://0.0.0.0:10001/app2/ | g1 |
| ap3 | http://0.0.0.0:10002/app3/ | g2 |
| ⋮ | ⋮ | ⋮ |

| APPLICATION ID | VIRTUAL URL | GROUP KEY |
|---|---|---|
| ap1 | http://g1.com/app1/ | g1 |
| ap2 | http://g1.com/app2/ | g1 |
| ap3 | http://g2.com/app3/ | g2 |
| ⋮ | ⋮ | ⋮ |

METHOD AND APPARATUS FOR EXECUTING APPLICATION

CROSS-REFERENCE TO RELATED APPLICATIONS

This application is based upon and claims the benefit of priority of the prior Japanese Patent Application No. 2016-066155, filed on Mar. 29, 2016, the entire contents of which are incorporated herein by reference.

FIELD

This invention relates to a technique for causing a browser engine to execute an application.

BACKGROUND

Local storage that is used by an HTML (HyperText Markup Language) 5 application that is executed by a browser engine is provided for each origin of that HTML 5 application. An origin is a combination of a scheme, host, and port that are included in a URL (Uniform Resource Locator). For example, in an aspect in which delivery servers are accessed from a browser engine and plural HTML5 applications are executed, when the delivery servers of providers are all different, local storage that is used by each HTML5 application is separately provided.

In an example illustrated in FIG. 1, a browser engine 111 accesses a delivery server 103a by way of the Internet and loads an HTML5 application 113a. When doing this, an HTTP (Hypertext Transfer Protocol) request in which a URL "http://aplstore1.com/index.html" has been set is sent to the delivery server 103a from the browser engine 111. Moreover, the browser engine 111 accesses a delivery server 103b by way of the Internet and loads an HTML5 application 113b. When doing this, an HTTP request in which a URL "http://aplstore2.com/index.html" has been set is sent to the delivery server 103b from the browser engine 111.

The origin of the HTML5 application 113a is "http://aplstore1.com/", and the origin of the HTML5 application 113b is "http://aplstore2.com/", and the origins do not match. Therefore, local storage 115a that is used by the HTML5 application 113a, and local storage 115b that is used by the HTML5 application 113b are separately provided.

The HTML5 application 113a, the HTML5 application 113b, the local storage 115a and the local storage 115b are included in a management range 117 of the browser engine 111.

As another aspect, when an HTML5 application 113 that has once been internally stored is operated by the browser engine 111, the origin of the HTML5 application 113 becomes the same, for example "file:///", regardless of the Web site of the provider. As a result, even in the case of an HTML5 application 113 that is provided from a different delivery server 103, the same local storage 115 is used.

In an example illustrated in FIG. 2, an obtaining unit 201 obtains an application package 203a that includes an HTML5 application 113a from the delivery server 103a, and a user terminal 101 is set to a state of internally storing the HTML5 application 113a. Moreover, the obtaining unit 201 obtains an application package 203b that includes an HTML5 application 113b from the delivery server 103b, and the user terminal 101 is set to a state of internally storing the HTML5 application 113b. The application package 203 is a package that includes files and metadata that are used when executing the HTML5 application 113. The user terminal 101 is a smartphone, for example.

The browser engine 111 then internally loads the HTML5 application 113a from the application package 203a. The URL "file:///data/apps/app1/index.html" is set in the request at this time. Moreover, the browser engine 111 internally loads the HTML5 application 113b from the application package 203b. The URL "file:///data/apps/app2/index.html" is set in the request at this time.

The origin of the HTML5 application 113a is "file:///", and the origin of the HTML5 application 113b is "file:///", and they match. Therefore, the HTML5 application 113a and the HTML5 application 113b share a local storage 115c. The obtaining unit 201, the application package 203a, the application package 203b and the management range 117 are included in the execution environment 205 of the HTML5 application 113. The execution environment 205 is controlled as a unit.

In this way, when the local storage 115 is shared, there is a possibility that data will be referenced or changed by an HTML5 application 113 having a different provider. The HTML5 application 113 is an example of a Web application.

Patent Document 1: Japanese Laid-open Patent Publication No. 2001-051839

Patent Document 2: International Publication Pamphlet No. WO 2009/139437

Patent Document 3: Japanese Laid-open Patent Publication No. 2007-336335

Patent Document 4: Japanese Laid-open Patent Publication No. 2007-323115

SUMMARY

There is no technique to assign a unique origin for each application when causing a browser engine to execute plural applications that are stored internally.

An information processing apparatus relating to one aspect includes a memory and a processor coupled to the memory. And the processor is configured to: instruct a browser engine to load an application based on a virtual URL corresponding to a path of a storage location of the application, the application being stored in a storage unit and to be executed by the browser engine; and provide, to the browser engine, the application identified by the path corresponding to the virtual URL, when receiving, from the browser engine, a request to obtain data using the virtual URL as a proxy.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 14 is a diagram depicting a sequence of an instruction phase;

DESCRIPTION OF EMBODIMENTS

Embodiment 1

Before explaining this embodiment, a certain method for dividing the local storage 115 that is used by plural HTML5 applications 113 that are internally stored will be described.

In a certain method, an internal server having different origin is provided for each HTML5 application 113, and the browser engine 111 accesses and reads an HTML5 application 113 from those internal servers. The internal servers functionally correspond to web servers. For example, when a different port number is assigned to a socket that is used by each of the internal servers respectively, it is possible to distinguish an origin of each HTML5 application 113. Therefore, a different local storage 115 is assigned for each HTML5 application 113.

Figure 1:
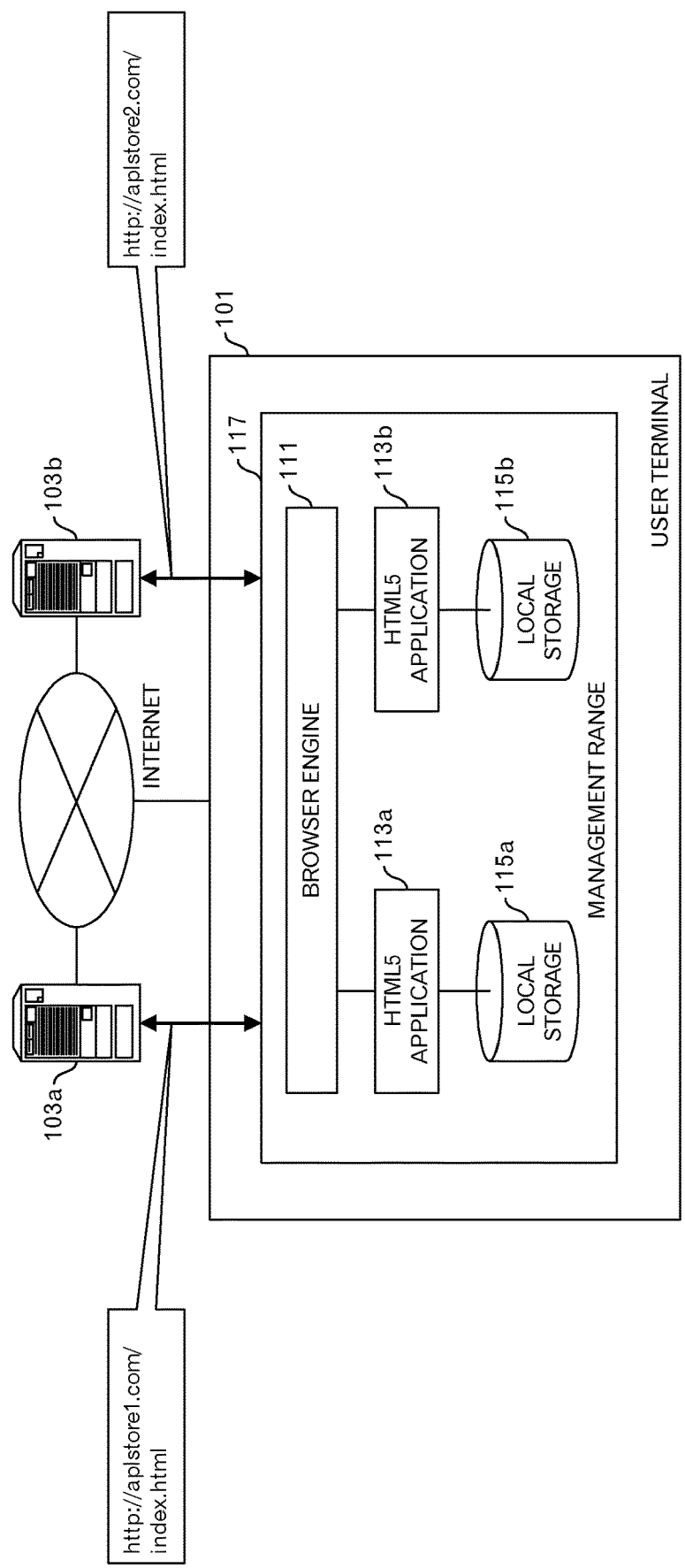
FIG. 1 is a diagram depicting an example in which a browser engine in a user terminal loads HTML5 applications from a delivery server.
Figure 2:
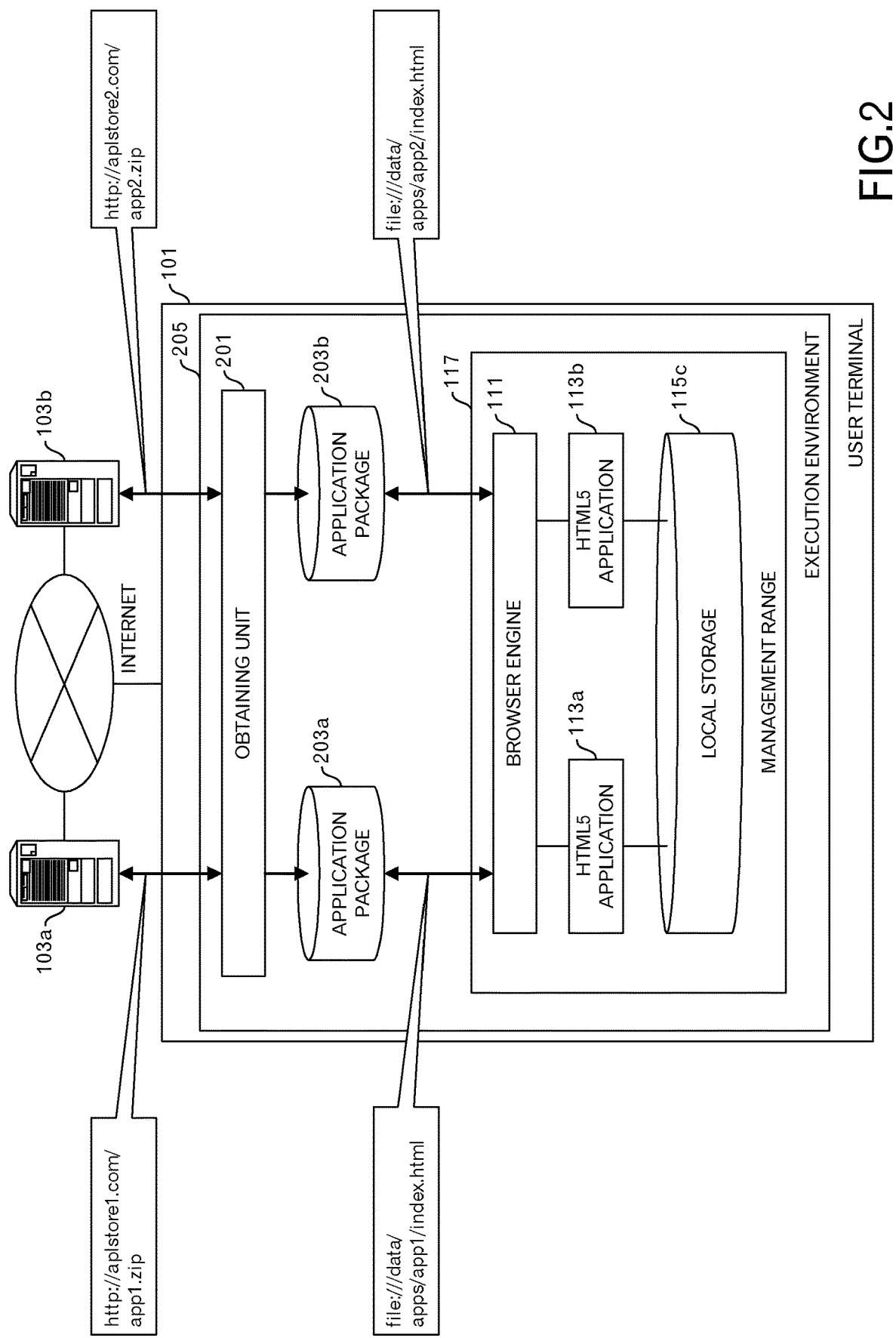
FIG. 2 is a diagram depicting an example in which the browser engine in the user terminal loads HTML5 applications that are stored internally.
Figure 3:
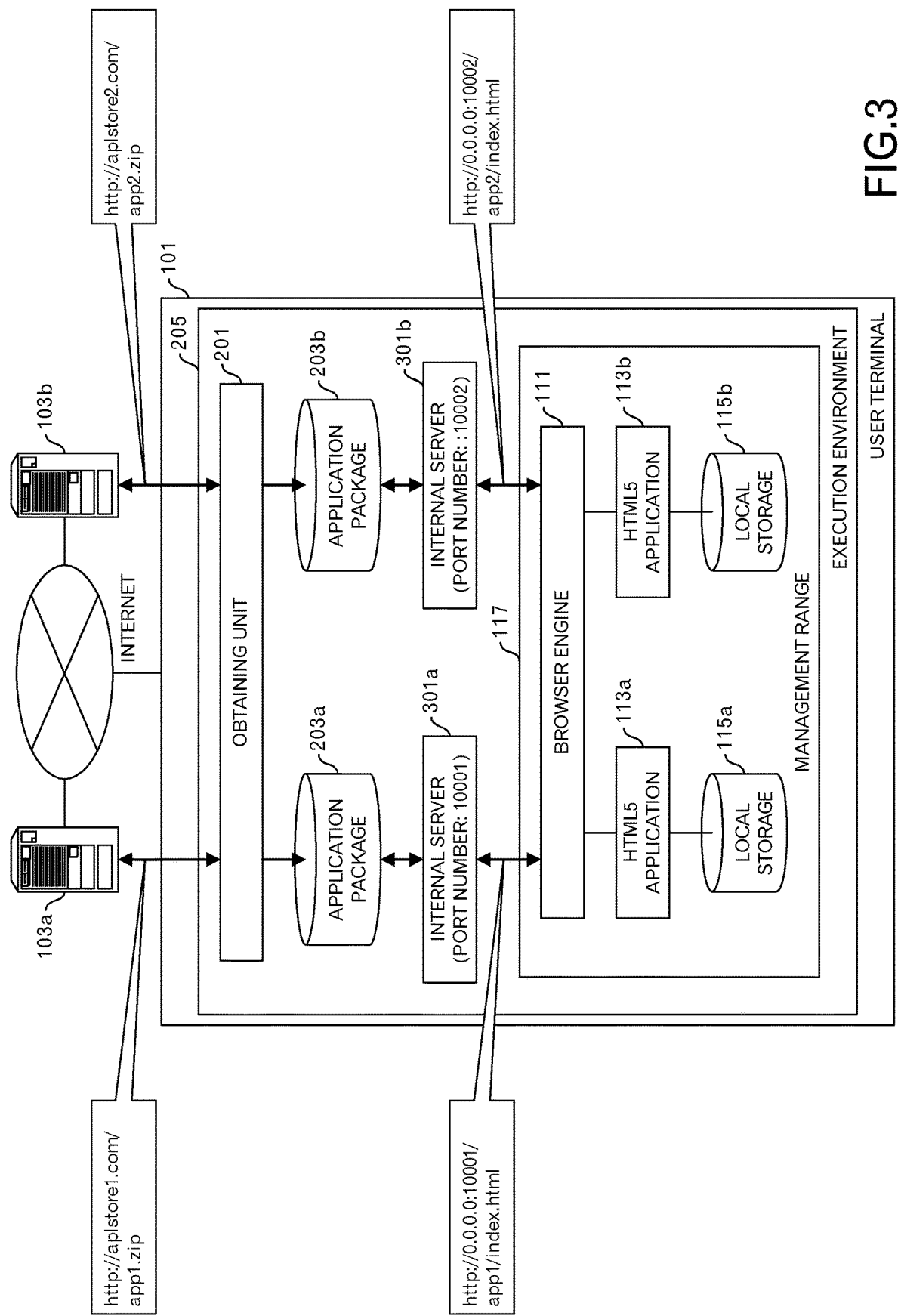
FIG. 3 is a diagram depicting an example in which the browser engine in the user terminal loads HTML5 applications from an internal server.

FIG. 3 illustrates an example in which the browser engine 111 of a user terminal 101 loads an HTML5 application 113 from an internal server 301. As in the case of FIG. 2, it is assumed that the user terminal 101 has the application package 203a and the application package 203b. In this example, an internal server 301a is assigned to the application package 203a, and an internal server 301b is assigned to the application package 203b. The internal server 301a and the internal server 301b are included in an execution environment 205.

The browser engine 111 then accesses the internal server 301a using a socket having port number "10001", and loads an HTML5 application 113a. When doing this, an HTTP request in which the URL "http://0.0.0.0:10001/app1/index.html" is set is sent to the internal server 301a from the browser engine 111. Moreover, the browser engine 111 accesses the internal server 301b using a socket having port number "10002", and loads an HTML5 application 113b. When doing this, an HTTP request in which the URL "http://0.0.0.0:10002/app2/index.html" is set is sent to the internal server 301b from the browser engine 111.

The origin of the HTML5 application 113a is "http://0.0.0.0:10001", and the origin of the HTML5 application 113b is "http://0.0.0.0:10002", and they do not match. Therefore, local storage 115a that is used by the HTML5 application 113a, and local storage 115b that is used by the HTML5 application 113b are separately provided.

Here, it is assumed that plural execution environments 205 for HTML5 applications 113, each of which includes the browser engine 111, are provided. For example, an execution environment 205 for an application group for schools and an execution environment 205 for an application group for a commercial facility coexist in the user terminal 101.

In such an aspect, when a port number is assigned using a unique procedure in each execution environment 205, it is possible that port numbers that are assigned to the internal servers 301 in each of the execution environments 205 will overlap. In the case that port numbers overlap, it is impossible to activate one of internal servers 301. In other words, parallel operation of HTML5 applications 113 in plural execution environments 205 is not guaranteed.

Figure 4:
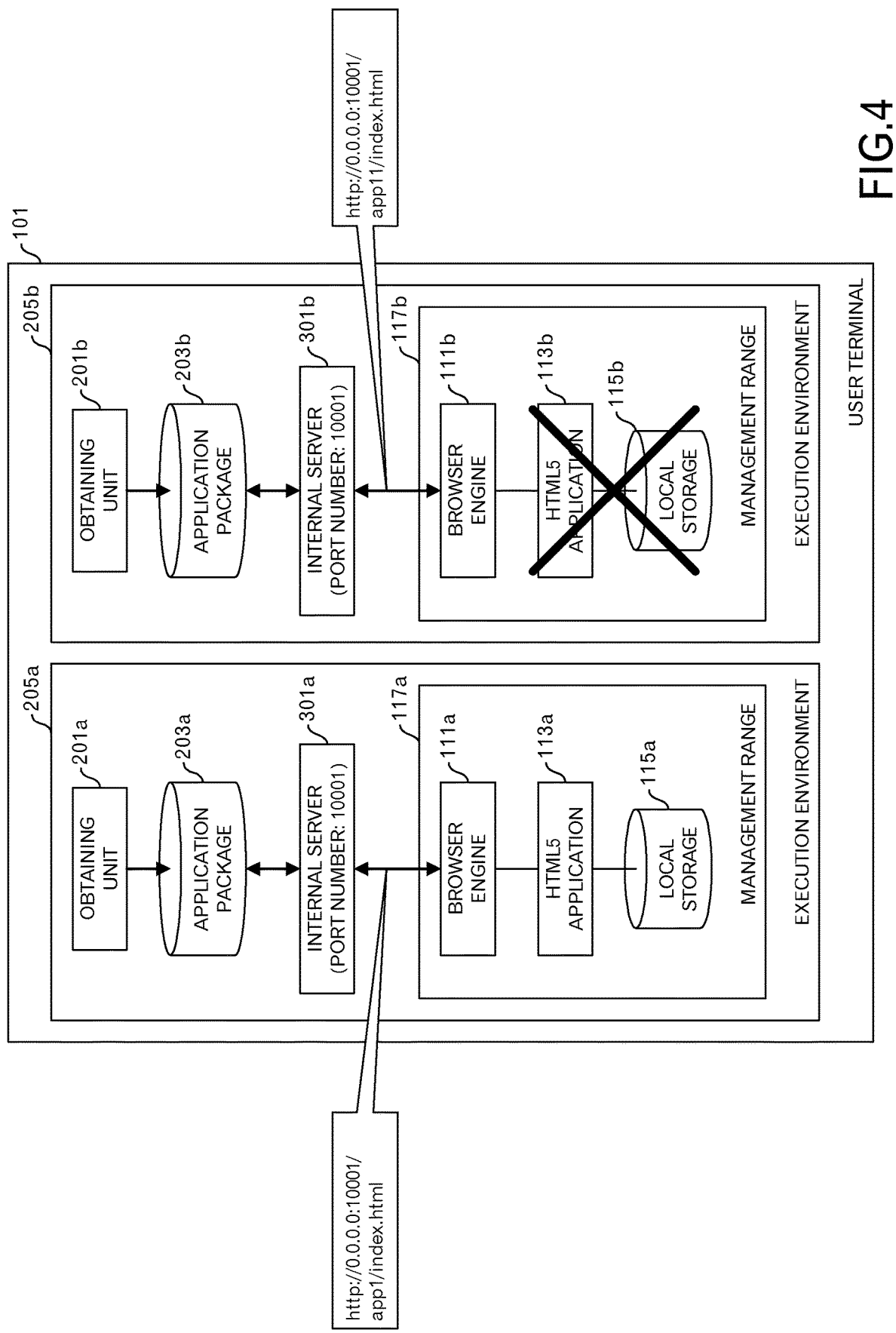
FIG. 4 is a diagram depicting an example of providing 2 execution environments in the user terminal.

In an example illustrated in FIG. 4, an execution environment 205a and an execution environment 205b are provided in the user terminal 101. In the execution environment 205a, when an internal server 301a is using port number "10001", and in the execution environment 205b, when an internal server 301b tries to use port number "10001", a socket cannot be generated. In other words, a state occurs in which the internal server 301b is not activated, and the application package 203b cannot be executed in the execution environment 205b.

Figure 5:
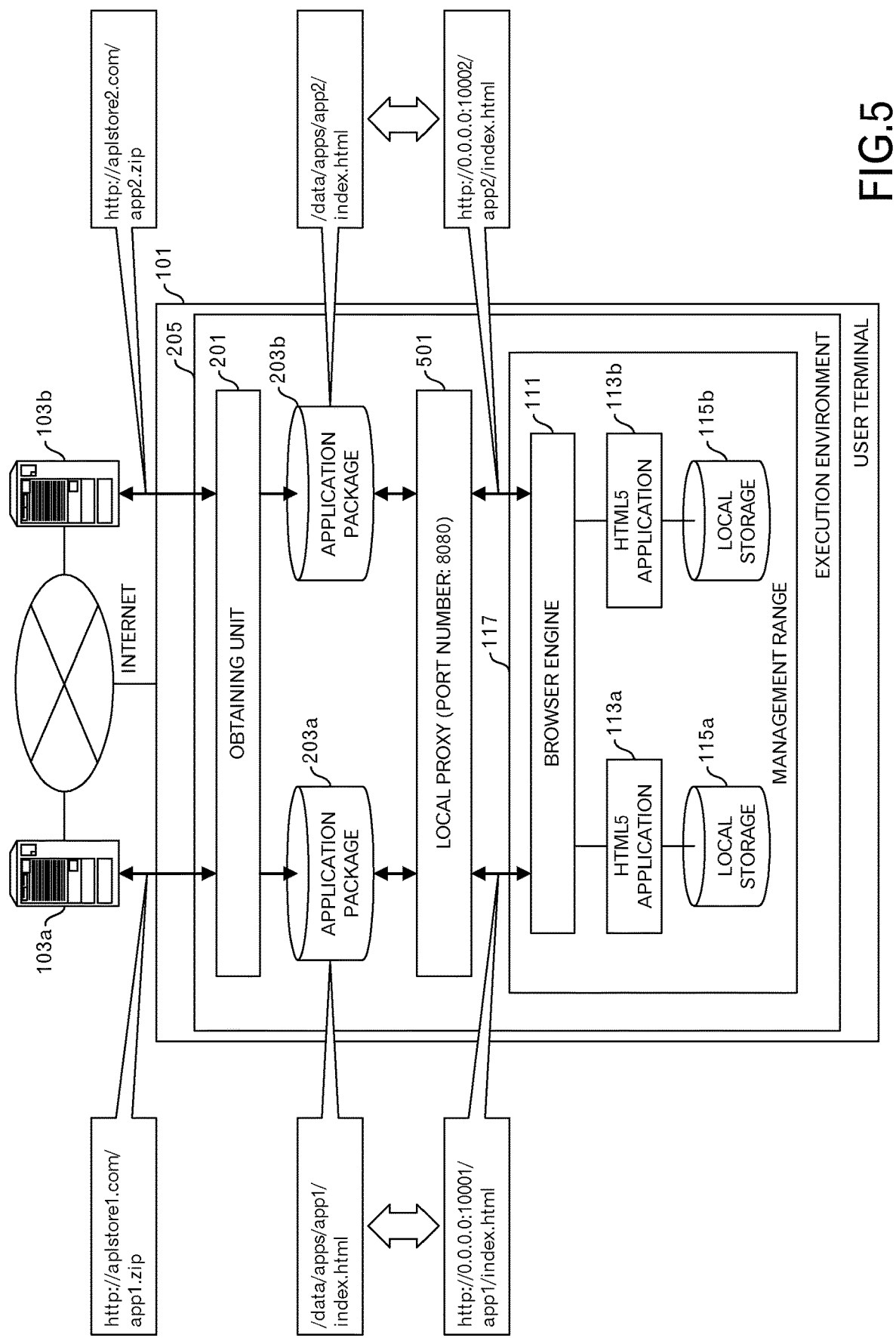
FIG. 5 is a diagram depicting an outline of this embodiment.

Next, an outline of this embodiment is explained with reference to FIG. 5. As in the case of FIG. 2, it is presumed that the user terminal 101 stores the application package 203a and the application package 203b. In this embodiment, a local proxy 501 is provided in the execution environment 205. The local proxy 501 receives requests from the browser engine 111 using a socket of port number "8080".

When the browser engine 111 loads an HTML5 application 113a, a request in which the URL "http://0.0.0.0:10001/app1/index.html" is set is sent to the local proxy 501. Moreover, when the browser engine 111 loads an HTML5 application 113b, a request in which the URL "http://0.0.0.0:

10002/app2/index.html" is set is sent to the local proxy 501. The URL used at this time is virtual, and it does not need to be real.

The local proxy 501 specifies paths that correspond to the virtual URLs. Specifically, the local proxy 501 specifies a path "/data/apps/app1/index.html" for the application package 203*a* that corresponds to the URL "http://0.0.0.0:10001/app1/index.html". Moreover, the local proxy 501 specifies a path "/data/apps/app2/index.html" for the application package 203*b* that corresponds to the URL "http://0.0.0.0:10002/app2/index.html". Then, the local proxy 501 reads a file from a storage location represented by each path, and gives those files to the browser engine 111.

In this example, the origin of the HTML5 application 113*a* is "http://0.0.0.0:10001", and the origin of the HTML5 application 113*b* is "http://0.0.0.0:10002", and they do not match. Therefore, local storage 115*a* that is used by the HTML5 application 113*a* and local storage 115*b* that is used by the HTML5 application 113*b* are separately provided.

In this embodiment, sockets are not generated in the local proxy 501 according to port numbers that are included in the origins. In this example, neither a socket for port number "10001" nor a socket for port number "10002" are generated.

Figure 6:
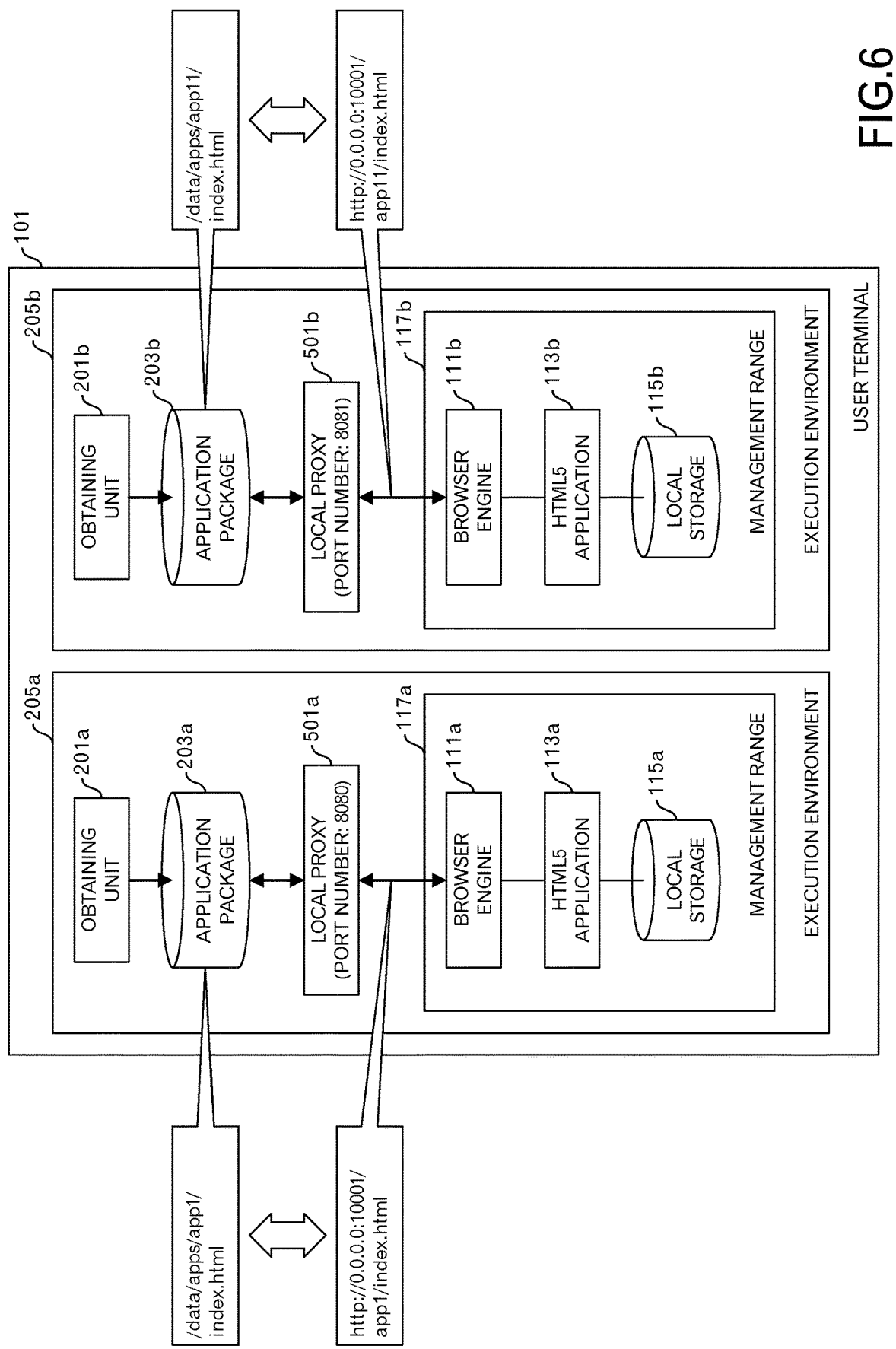
FIG. 6 is a diagram depicting an example of providing 2 execution environments in this embodiment.

Therefore, an error due to duplication of port numbers does not occur. FIG. 6 illustrates an example in which two execution environments 205 are provided in this embodiment. In this example, a local proxy 501*a* that is provided in an execution environment 205*a* uses a socket for port number "8080", and a local proxy 501*b* that is provided in an execution environment 205*b* uses a socket for port number "8081".

In this example, the origin of the HTML5 application 113*a* is "http://0.0.0.0:10001", and the origin of the HTML5 application 113*b* is "http://0.0.0.0:10001", and they match. However, the local storage 115*a* that the HTML5 application 113*a* uses, and the local storage 115*b* that the HTML5 application 113*b* uses belong to different execution environments 205, and they are provided separately.

Moreover, because both the execution environment 205*a* and the execution environment 205*b* operate without providing a socket having the port number "10001", there is no conflict between the ports. Therefore, in regard to parallel operation, the problems described above do not occur. This completes an explanation of the outline of this embodiment.

Figure 7:
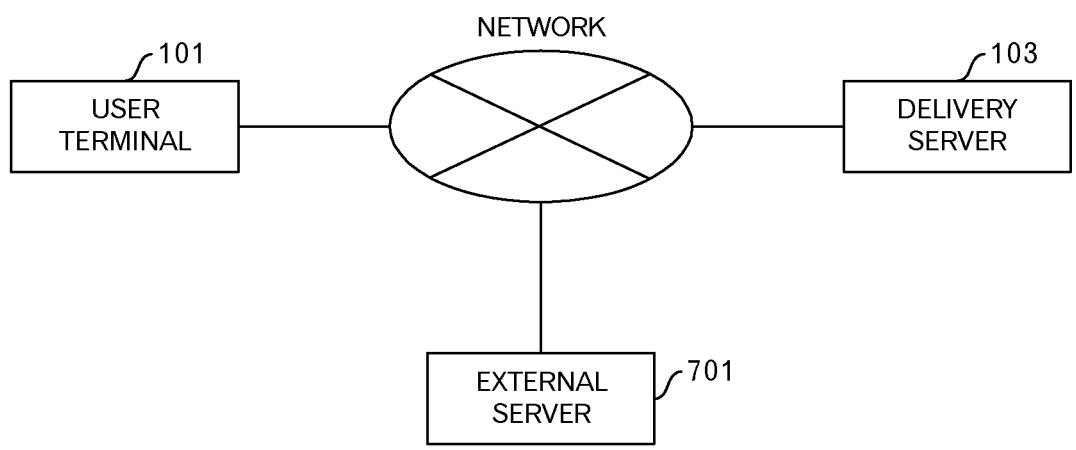
FIG. 7 is a diagram depicting a network configuration example.

Referring again to FIG. 7, network configuration of a distribution system according to the present embodiment will be described. The delivery server 103 is connected to the network. The network may be the Intranet.

The user terminal 101 accesses the delivery server 103 by way of the network. The form of access can be access that uses a wireless LAN (Local Area Network).

In the following example, it is presumed that an external server 701 is also accessed when executing an HTML5 application 113 in the user terminal 101. This will be explained in detail later.

Plural delivery servers 103 to be provided. Plural user terminals 101 may be provided. Plural external servers 701 may be provided.

Figure 8:
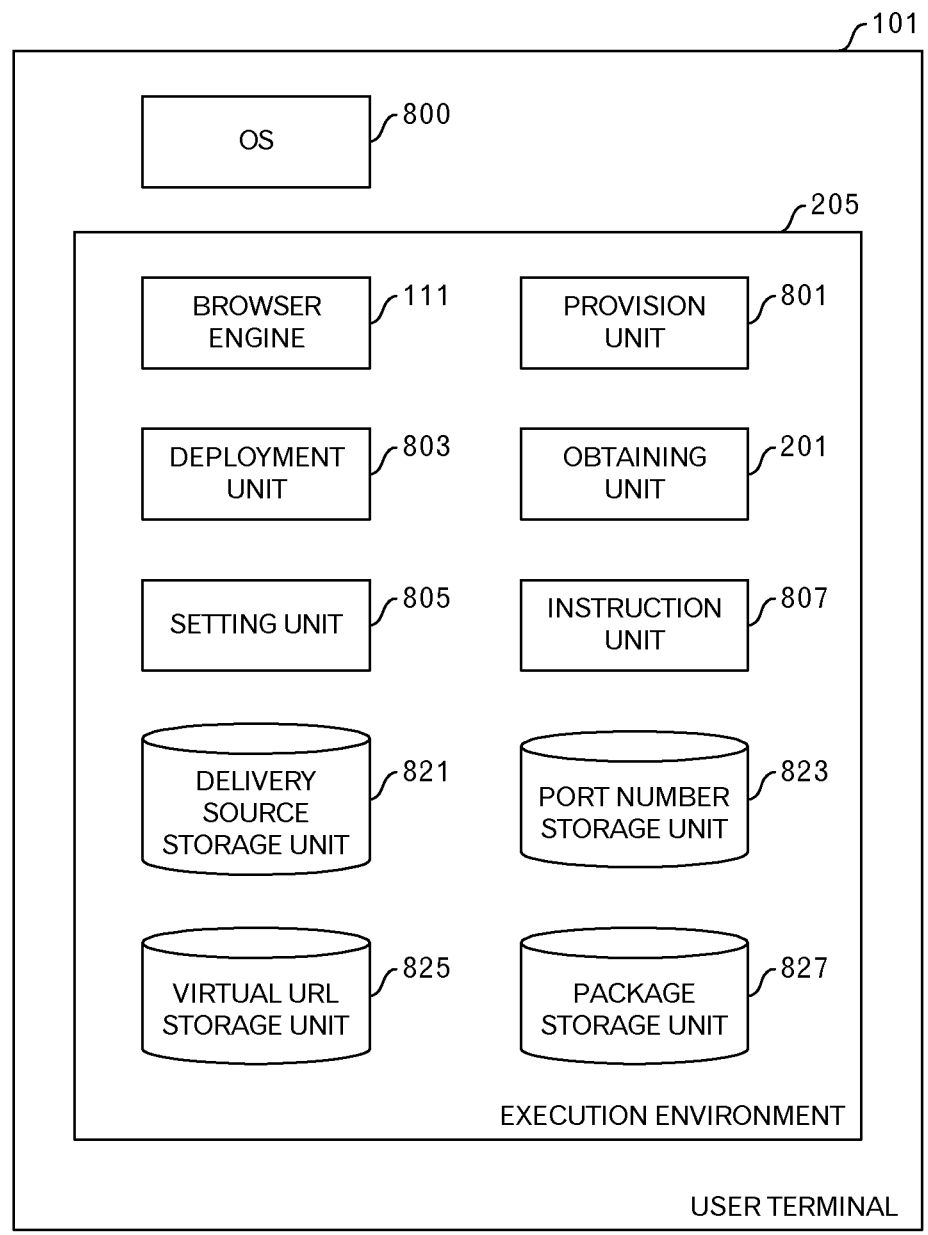
FIG. 8 is a diagram depicting a module configuration example of the user terminal.

FIG. 8 illustrates an example of modular configuration of the user terminal 101. The user terminal 101 has an OS (Operating System) 800 and an execution environment 205. The user terminal 101 may also have plural execution environments 205.

The execution environment 205 has, in addition to the browser engine 111 and an obtaining unit 201, a provision unit 801, a deployment unit 803, a setting unit 805 and an instruction unit 807. The browser engine 111 performs browsing processing according to HTML5. Therefore, for example, the browser engine 111 has modules related to a rendering engine, networking, a UI (User Interface) backend and data storage, except for a user interface among modules included in a normal browser. The obtaining unit 201 obtains an application package 203 from the delivery server 103. The provision unit 801 corresponds to a local proxy 501 that has been described above, and provides files that are included in the application package 203 to the browser engine 111. The deployment unit 803 deploys an application package 203 to a predetermined storage location. The setting unit 805 performs initial settings of the execution environment 205. The instruction unit 807 gives an instruction to load an HTML5 application 113 (hereinafter, this will be referred to as application loading). The local proxy 501 may be, as in the case of a conventional proxy server, outside of the user terminal 101. In that case, the proxy server has the provision unit 801, the deployment unit 803, the obtaining unit 201, the delivery source storage unit 821, the virtual URL storage unit 825 and the package storage unit 827.

The execution environment 205 further has a delivery source storage unit 821, a port number storage unit 823, a virtual URL storage unit 825 and a package storage unit 827. The delivery source storage unit 821 stores a delivery source table. The delivery source table will be described later using FIG. 9. The port number storage unit 823 stores port numbers that are used by the provision unit 801. The virtual URL storage unit 825 stores a virtual URL table. The virtual URL table will be described later using FIG. 13A. The package storage unit 827 stores application packages 203.

The provision unit 801, deployment unit 803, obtaining unit 201, setting unit 805 and instruction unit 807 described above are realized by using hardware resources (for example, refer to FIG. 24) and a program that causes a processor to execute processing that will be described below.

Figures 23, 24:
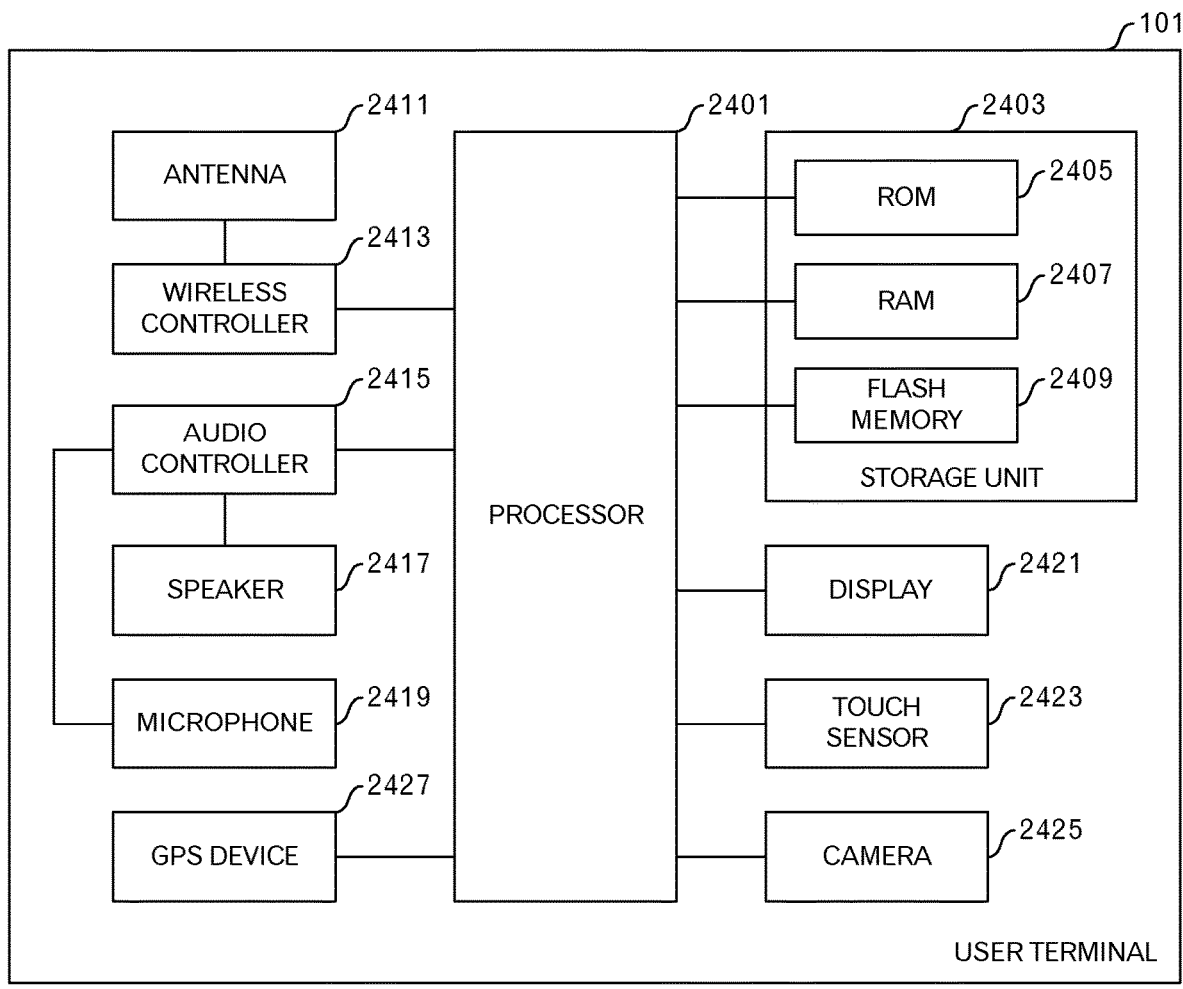
FIG. 23 is a diagram depicting an example of the virtual URL table in the third embodiment.
FIG. 24 is a diagram depicting a hardware configuration example of the user terminal.

The delivery source storage unit 821, port number storage unit 823, virtual URL storage unit 825 and package storage unit 827 are realized by using hardware resources (for example, refer to FIG. 24).

Figures 9, 10:
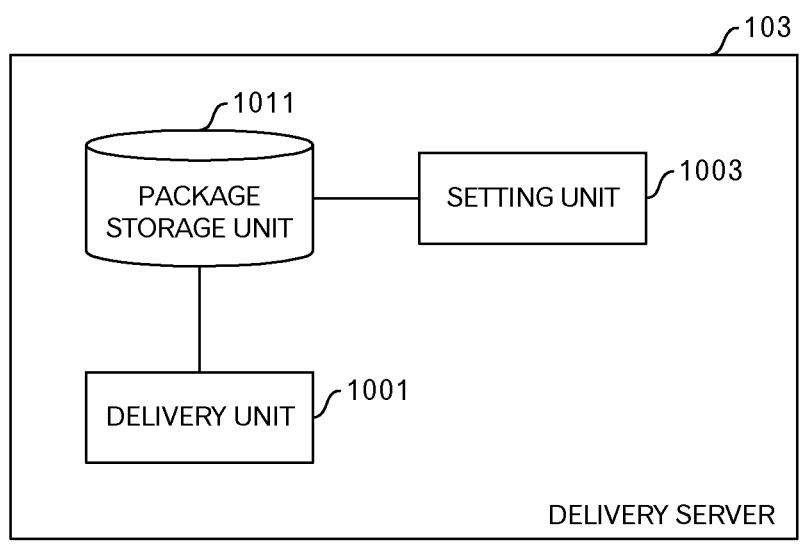
FIG. 9 is a diagram depicting an example of a delivery source table.
FIG. 10 is a diagram depicting a module configuration example of the delivery server.

FIG. 9 illustrates an example of a delivery source table. The delivery source table of this example has records that correspond to HTML5 applications 113. The records of the delivery source table have a field for setting an application ID, and a field for setting a delivery source URL. The first record illustrated in FIG. 9 represents that an HTML5 application 113 having an ID "ap1" is obtained by accessing the delivery source URL "http://ap1store1.com/app1.zip".

FIG. 10 illustrates an example of modular configuration of the delivery server 103. The delivery server 103 has a delivery unit 1001, a setting unit 1003 and a package storage unit 1011. The delivery unit 1001 delivers application packages 203. The setting unit 1003 sets predetermined parameters in the metadata of the application packages 203. The setting unit 1003 will be explained in embodiments 2 and 3. The package storage unit 1011 stores the application packages 203.

The delivery unit 1001 and the setting unit 1003 described above are realized by using hardware resources (for example, refer to FIG. 25) and a program that causes a processor to execute processing described below.

Figure 25:
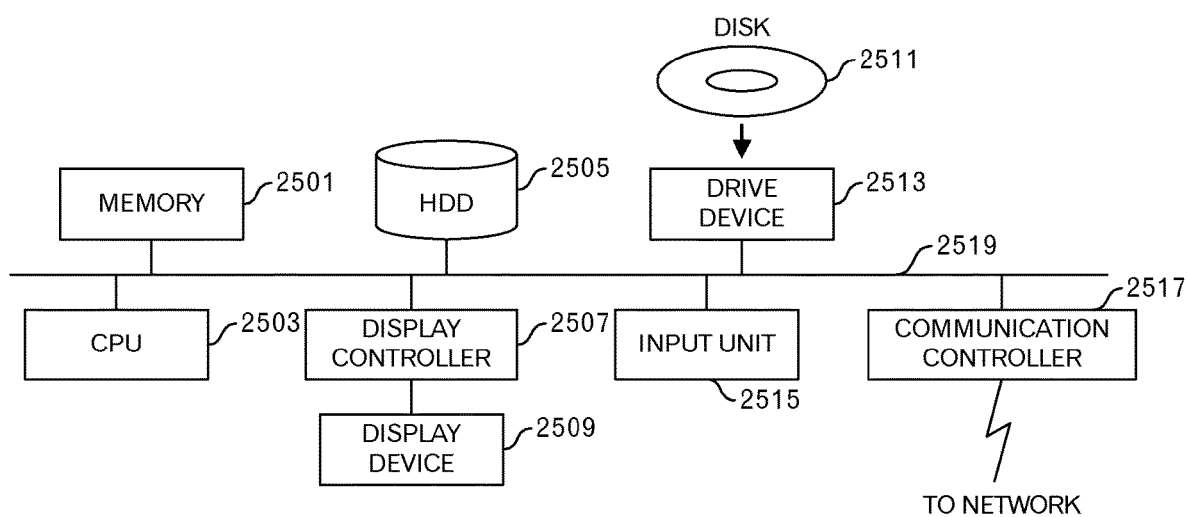
FIG. 25 is a functional block diagram of a computer.

The package storage unit 1011 described above is realized by using hardware resources (for example, refer to FIG. 25).

In the following, each of sequences of an initial setting phase, a deployment phase, an instruction phase and a provision phase will be explained.

Figure 11:
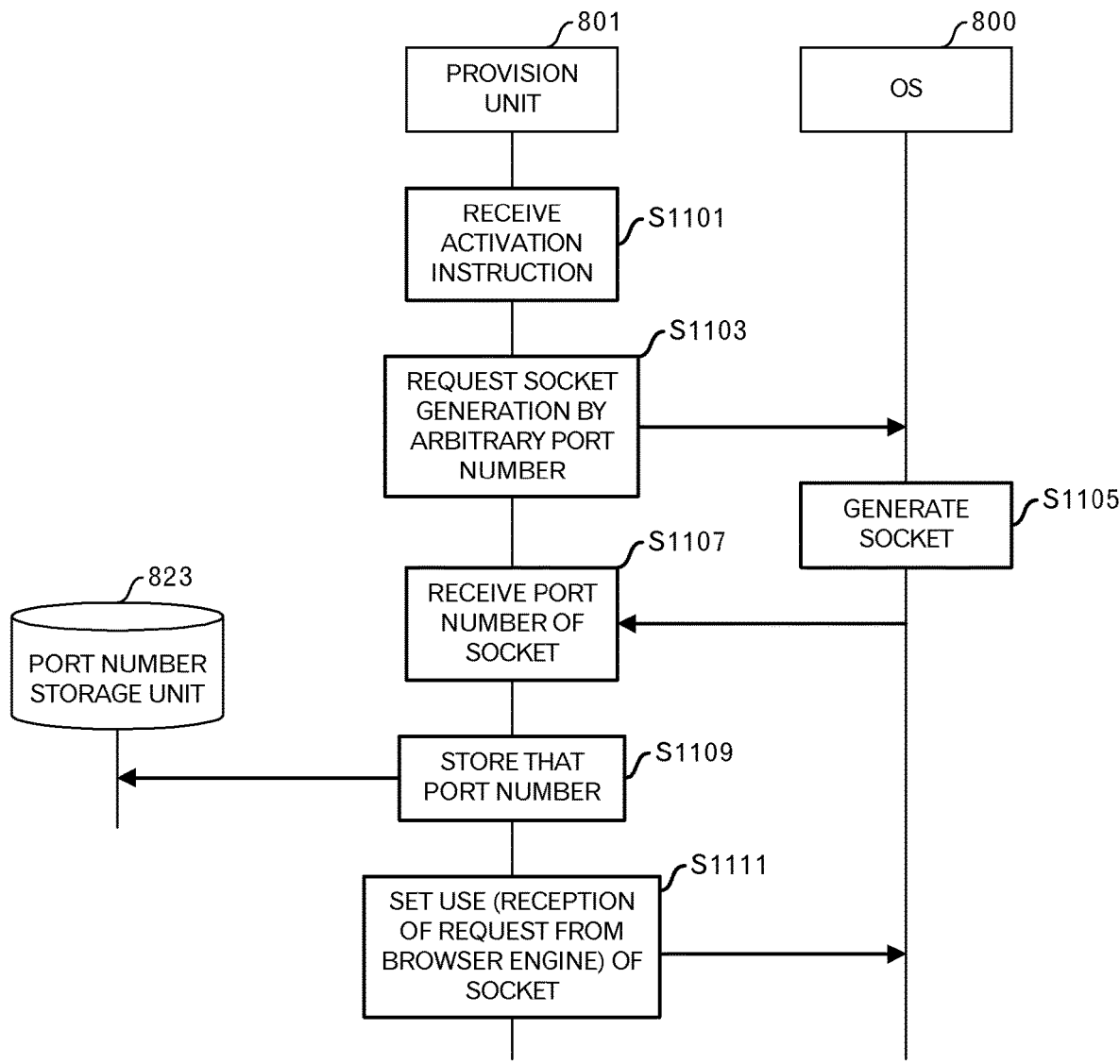
FIG. 11 is a diagram depicting a sequence of an initial setting phase.

FIG. 11 illustrates the sequence of the initial setting phase. In the initial setting phase, a socket that is used by the provision unit 801 is provided. When the provision unit 801 receives an activation instruction by way of a user interface (S1101), for example, the provision unit 801 sends a request to the OS 800 to generate a socket according to an arbitrary port number (S1103).

The OS 800 selects an unused port, and generates a socket according to that port (S1105). Then, the OS 800 sends the port number of that socket to the provision unit 801.

When the provision unit 801 receives the port number of the socket from the OS 800 (S1107), the provision unit 801 writes that port number in the port number storage unit 823 (S1109). The provision unit 801 further sets the use of the socket in the OS 800 (S1111). The use of the socket in this case is to receive requests from the browser engine 111.

Figures 12A, 13A:
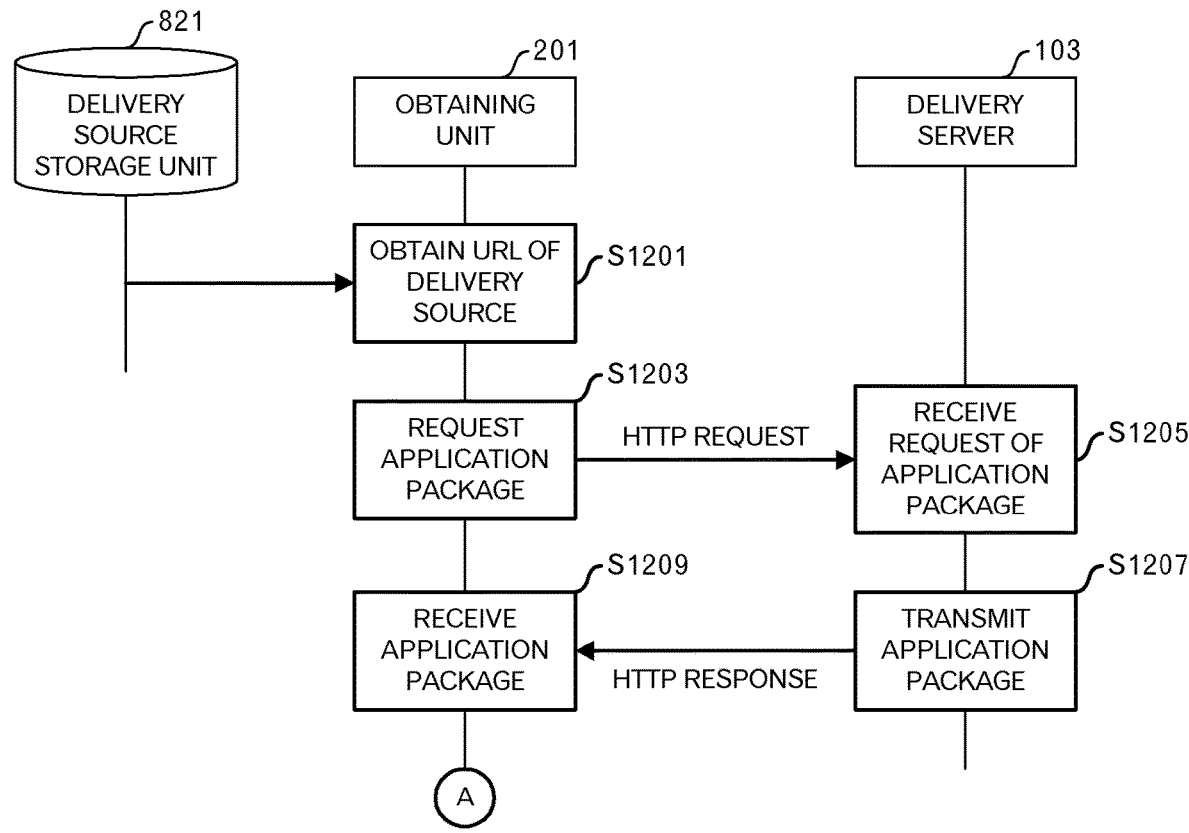
FIG. 12A is a diagram depicting a sequence of a deployment phase.
FIG. 13A is a diagram depicting an example of a virtual URL table.
Figure 12B:
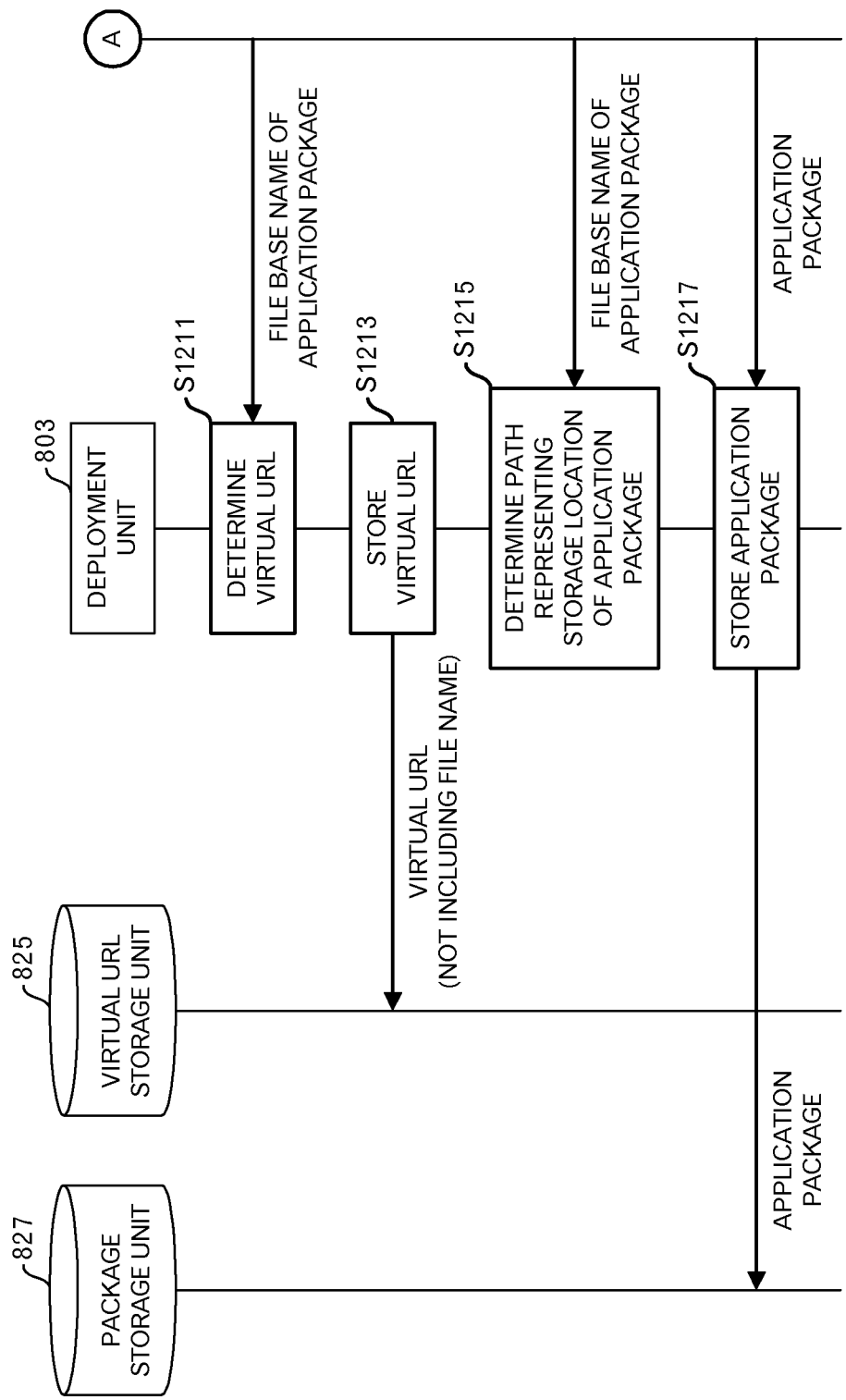
FIG. 12B is a diagram depicting a sequence of the deployment phase.

Next, the deployment phase will be explained. FIG. 12A and FIG. 12B illustrate the sequence of the deployment phase. In the deployment phase, the application package 203 that includes an HTML5 application 113 is deployed to the package storage unit 827.

First, the obtaining unit 201 obtains one delivery source URL (for example, "http://aplstore1.com/app1.zip") from the delivery source table (S1201). Then, the obtaining unit 201 sends a request to the delivery server 103 for an application package 203 (S1203). The delivery source URL is set in the HTTP request that is sent at this time.

When the delivery unit 1001 of the delivery server 103 receives a request for an application package 203 (S1205), the delivery server 103 sends the application package 203 that is stored in the package storage unit 1011 (S1207). In other words, a file (for example, app1.zip) of the application package 203 is included in the HTTP response that is sent at this time.

The obtaining unit 201 receives the application package 203 (S1209). The obtaining unit 201 may be configured so as to verify a digital signature that has been added to the application package 203. The processing by the obtaining unit 201 proceeds to the processing illustrated in FIG. 12B via terminal A.

The deployment unit 803 determines a virtual URL (for example "http://0.0.0.0:10001/app1/") (S1211). Specifically, the scheme name that is set in the virtual URL is "http". The IP address that is set in the virtual URL is an IP address (for example, "0.0.0.0") that means the user terminal 101 itself. A value that is obtained by sequentially adding 1 to a fixed number (for example, 10000) is used for the port number that is set in the virtual URL. A file base name (for example, "app1") of the application package 203 that was obtained by the obtaining unit 201 is used for the path name that is set in the virtual URL. The virtual URL in this phase does not include a file name. The deployment unit 803 writes the virtual URL in the virtual URL storage unit 825 (S1213).

The deployment unit 803 determines a path (for example, "/data/apps/app1") that represents a storage location of the application package 203 (S1215). Specifically, the deployment unit 803 sets a path by adding a lower-order directory (for example, "/app1") having the same name as the file base name of the application package 203 that was obtained by the obtaining unit 201 to the path of a higher-order directory (for example, "/data/apps") in the package storage unit 827. The higher-order directory is also called an upper directory, and the lower-order directory is also called lower directory. The deployment unit 803 stores the application package 203 in the package storage unit 827 according to that path (S1217).

FIG. 13A illustrates an example of a virtual URL table. The virtual URL table in this example has records that correspond to HTML5 applications 113. The records in the virtual URL table have a field for setting an application ID, and a field for setting a virtual URL.

The first record in FIG. 13A represents that the virtual URL "http://0.0.0.0:10001/app1/" is assigned to an HTML5 application 113 having ID "ap1". In this case, the origin is "http://0.0.0.0:10001".

Similarly, the second record represents that the virtual URL "http://0.0.0.0:10002/app2/" is assigned to an HTML5 application 113 having ID "ap2". In this case, the origin is "http://0.0.0.0:10002".

Similarly, the third record represents that the virtual URL "http://0.0.0.0:10003/app3/" is assigned to an HTML5 application 113 having ID "ap3". In this case, the origin is "http://0.0.0.0:10003".

Figure 13B:
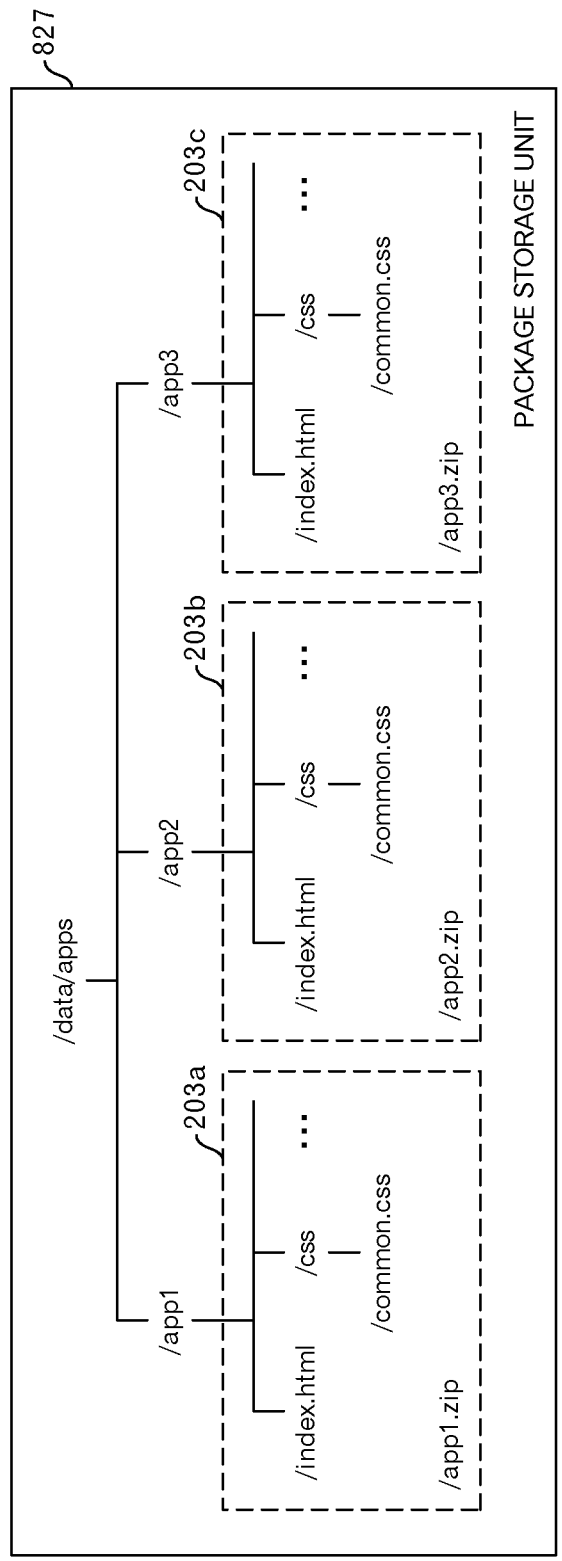
FIG. 13B is a diagram depicting a directory configuration example of a package storage unit.

FIG. 13B illustrates an example of the directory configuration of the package storage unit 827. The higher-order directory of the package storage unit 827 is "/data/apps". A directory is provided for each HTML5 application 113 below the higher-order directory.

For example, an application package 203a that corresponds to app1.zip is stored in directory "/app1". The application package 203a includes files such as "index.html" and "common.css". The lower-order directory is also defined in app1.zip. Moreover, it is presumed that a desired file is extracted at any time from the ZIP file.

Next, the instruction phase will be explained. FIG. 14 illustrates the sequence of the instruction phase. In the instruction phase, an instruction is given to the browser engine 111 to perform application loading.

First, the setting unit 805 reads a port number from the port number storage unit 823 (S1401). The setting unit 805 performs setting of a proxy for the browser engine 111 (S1403). Specifically, the setting unit 805 sets a host name and the port number for the user terminal 101. The processing of steps S1401 and S1403 may be performed in the initial setting phase.

The instruction unit 807 reads, from the package storage unit 827, a file name (for example, "index.html") that is included in the metadata of the application package 203 (S1405). The first loading target is identified by that file name.

The instruction unit 807 reads the virtual URL (for example, "http://0.0.0.0:10001/app1/") from the virtual URL storage unit 825 (S1407). The instruction unit 807 instructs the browser engine 111 to load an application based on the virtual URL to which the file name is added (for example, "http://0.0.0.0:10001/app1/index.html") (S1409).

Figure 15:
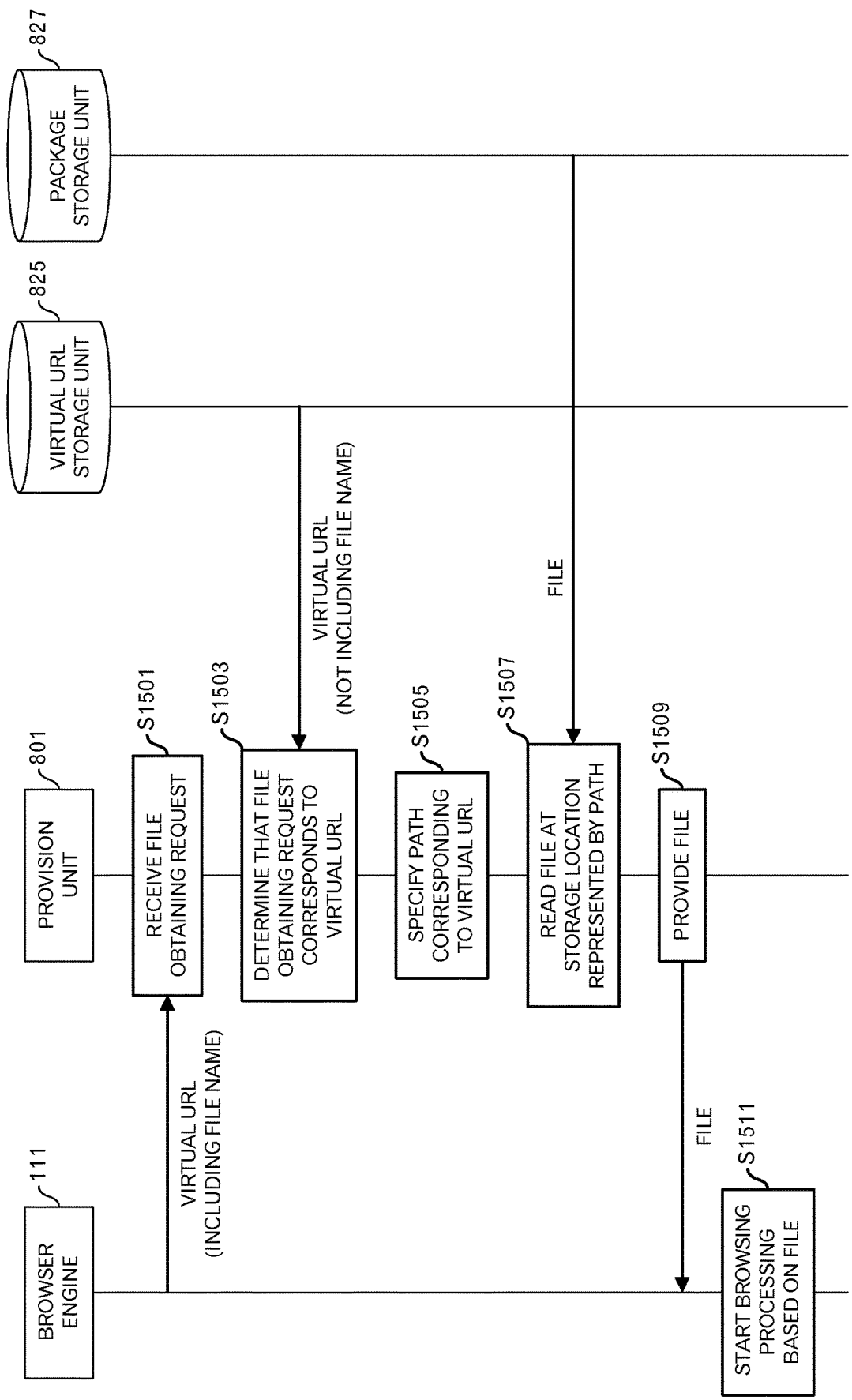
FIG. 15 is a diagram depicting a sequence of a provision phase.

Next, the provision phase will be explained. FIG. 15 illustrates the sequence of the provision phase. In the provision phase, the provision unit 801 provides a file that is included in the application package 203 to the browser engine 111.

First, the provision unit 801 receives a file obtaining request (HTTP request) from the browser engine 111 (S1501). A virtual URL (for example, "http://0.0.0.0:10001/app1/index.html") for which an instruction was given in step S1409 in FIG. 14 is set in that file obtaining request.

The provision unit 801 obtains the virtual URL (does not include the file name) from the virtual URL storage unit 825, and determines whether or not the file obtaining request corresponds to a virtual URL that is stored in the virtual URL storage unit 825. In this example, the provision unit 801 determines that the file obtaining request corresponds to a virtual URL (for example, "http://0.0.0.0:10001/app1/") that is stored in the virtual URL storage unit 825 (S1503).

When it is determined that the file obtaining request corresponds to a virtual URL that is stored in the virtual URL storage unit 825, the provision unit 801 identifies the path (for example, "/data/apps/app1/index.html") that corresponds to the virtual URL that is set in the file obtaining request (S1505). Specifically, a path that represents storage location of the file is determined by adding the path name (for example, "app1/index.html") that is included in the virtual URL that is set in the file obtaining request to the higher-order path (for example, "/data/apps") in the package storage unit 827. In addition to a path having a form that begins with "/" (for example, "/data/apps/app1/index.html"), the path may be in the form of an URL (for example, "file:///data/apps/app1/index.html").

The provision unit 801 reads, from the package storage unit 827, a file at the storage location represented by the path (S1507). The provision unit 801 provides the read file (for example, "index.html") to the browser engine 111 (S1509).

The browser engine 111 starts browsing processing based on that file (S1511). Other files (for example, "common.css") are read from the package storage unit 827 in the browsing processing.

Figure 16:
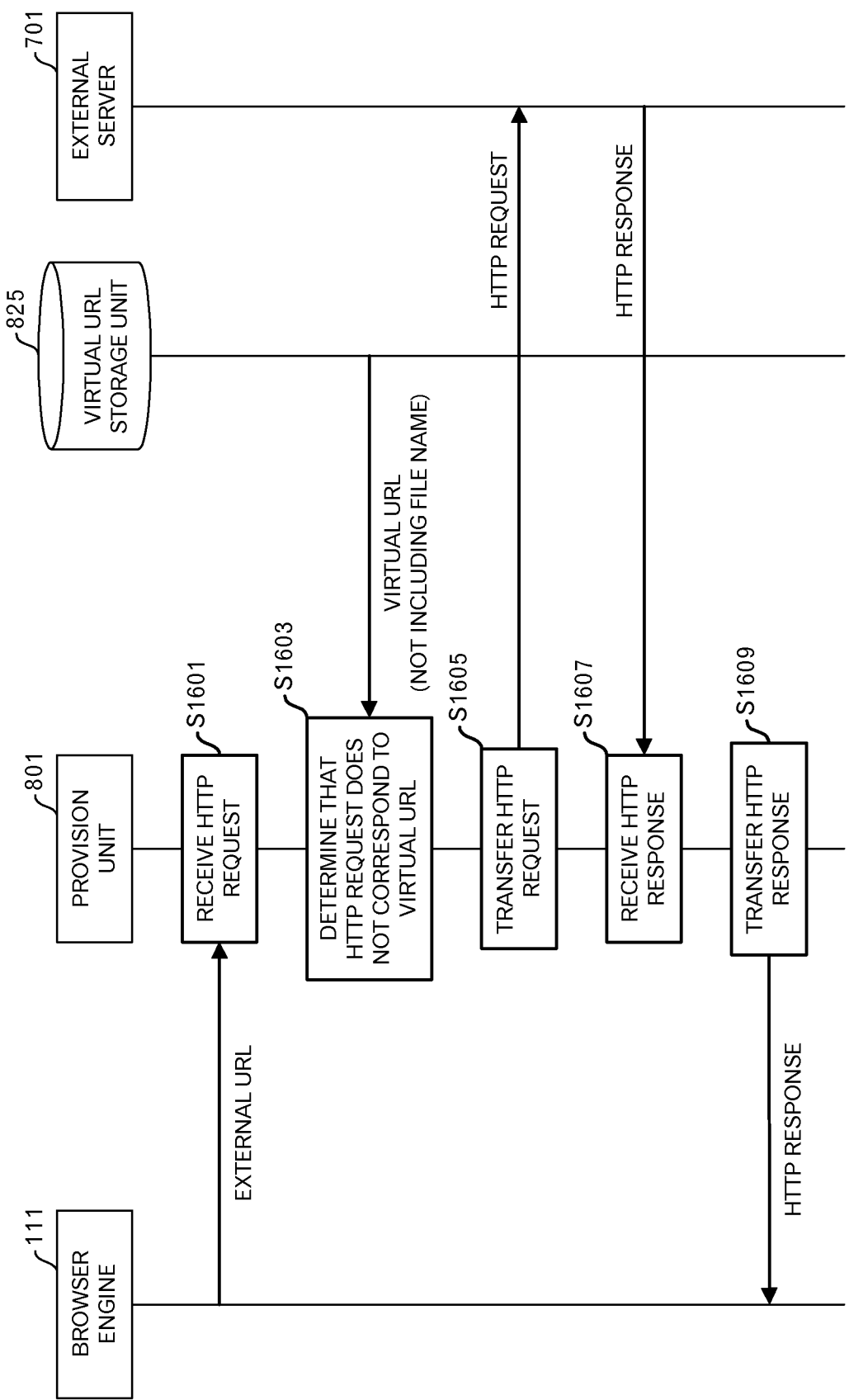
FIG. 16 is a diagram depicting a sequence of the provision phase.

In the browsing processing by the browser engine 111, an HTTP request to which an external URL is set may be given to the provision unit 801. The sequence in that case is illustrated in FIG. 16.

When the provision unit 801 receives, from the browser engine 111, an HTTP request to which an external URL is set (S1601), the provision unit 801 determines that the HTTP request does not correspond to a virtual URL that is stored in the virtual URL storage unit 825 (S1603). This is because the external URL points to an external server 701.

When it is determined that the HTTP request does not correspond to a virtual URL that is stored in the virtual URL storage unit 825, the provision unit 801 operates in the same way as a conventional proxy. Therefore, the provision unit 801 transfers that HTTP request to the external server 701 by way of the network (S1605).

Then, when the provision unit 801 receives an HTTP response from the external server 701 (S1607), the provision unit 801 transfers the received HTTP response to the browser engine 111 (S1609). It is presumed that CORS (Cross-Origin Resource Sharing) is set in the external server 701. CORS will be explained later.

Next, a case in which the external proxy 1731 has already been set in the browser engine 111 at the time of starting the initial setting phase will be described. In this case, the provision unit 801 saves the data related to the setting of the external proxy 1731, and performs processing of the initial setting phase.

Figure 17:
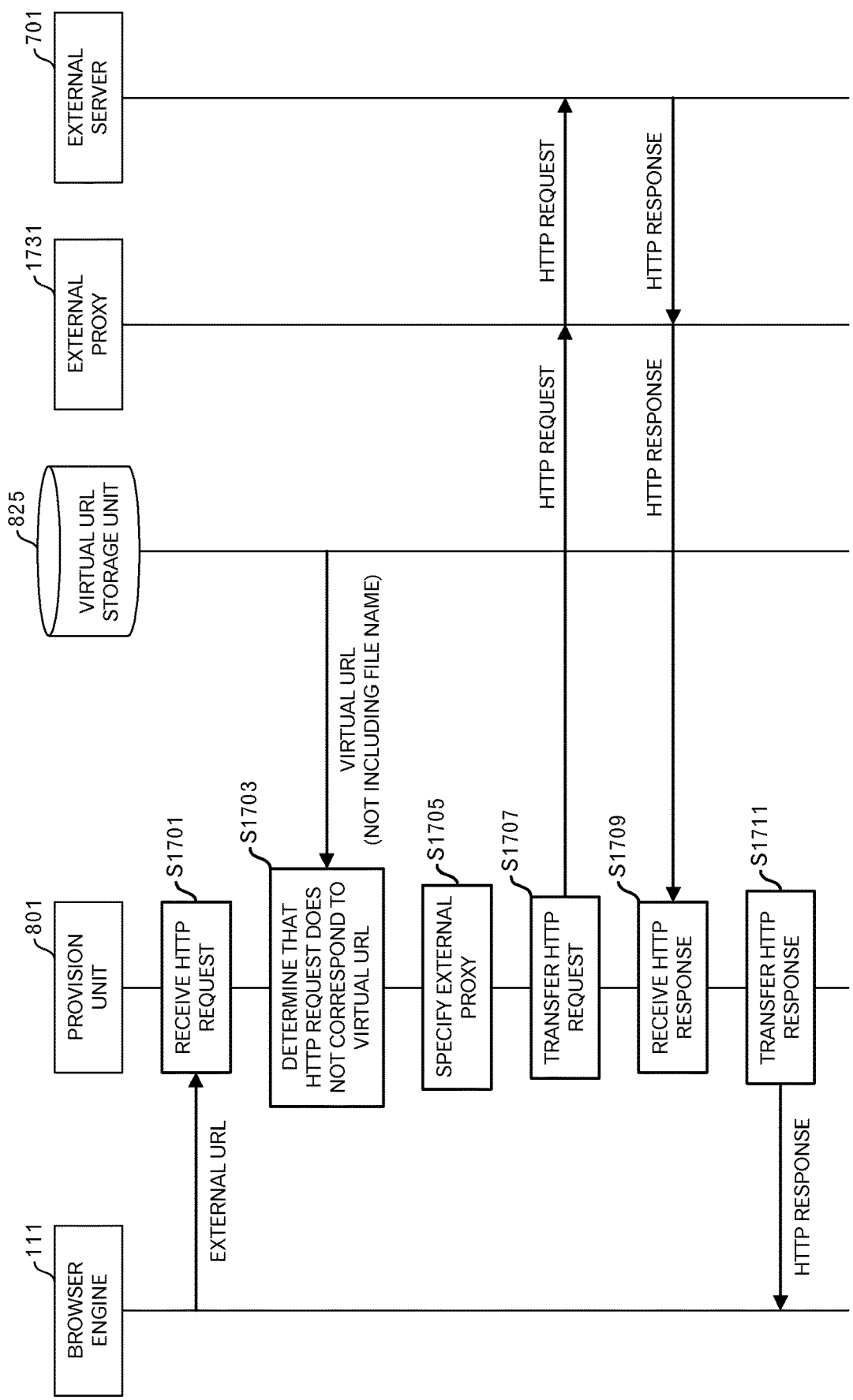
FIG. 17 is a diagram depicting a sequence of the provision phase.

Then, in the provision phase, the provision unit 801 transfers the HTTP request to that external proxy 1731. The sequence in this case will be explained using FIG. 17.

As in the case of FIG. 16, when the provision unit 801 receives an HTTP request from the browser engine 111 (S1701), the provision unit 801 determines that the HTTP request does not correspond to a virtual URL (S1703). Then, the provision unit 801 identifies the external proxy 1731 based on the data that was saved in the initial setting phase (S1705).

The provision unit 801 transfers the HTTP request to the external proxy 1731 (S1707). The HTTP request is sent to the external server 701 by way of the external proxy 1731. After that, the provision unit 801 receives an HTTP response by way of the external proxy 1731 (S1709). The provision unit 801 transfers the HTTP response to the browser engine 111 (S1711).

In the example described above, by changing port numbers, the origins are prevented from overlapping. However, it is also possible to ensure that the origins do not overlap by changing the IP address or the host name.

Figures 18, 19A:
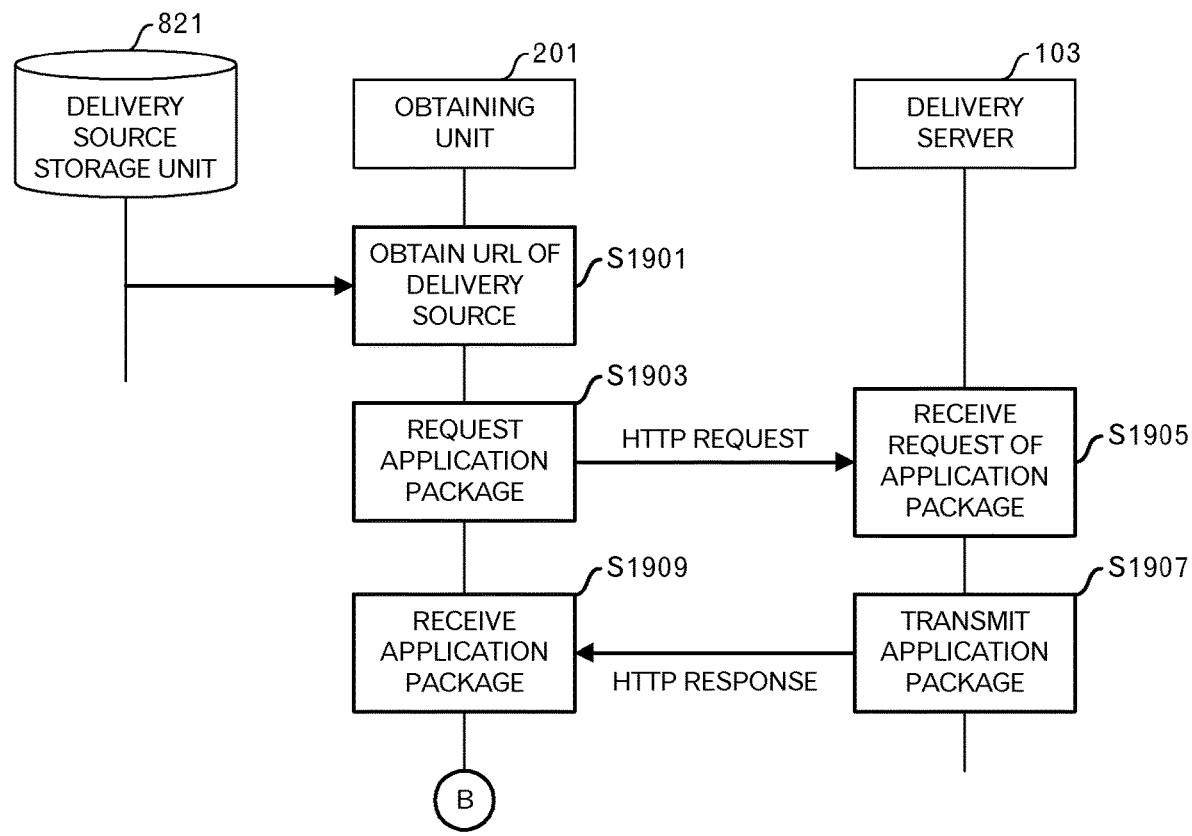
FIG. 18 is a diagram depicting an example of the virtual URL table.
FIG. 19A is a diagram depicting a sequence of the deployment phase in a second embodiment.

FIG. 18 illustrates an example of a virtual URL table when an IP address is changed. The first record in FIG. 18 represents that the virtual URL "http://127.0.0.1:10000/app1/" is assigned to the HTML5 application 113 having an ID "ap1". In this case, the origin is "http://127.0.0.1:10000".

Similarly, the second record represents that the virtual URL "http://127.0.0.2:10000/app2/" is assigned to the HTML5 application 113 having an ID "ap2". In this case, the origin is "http://127.0.0.2:10000".

Similarly, the third record represents that the virtual URL "http://127.0.0.3:10000/app3/" is assigned to the HTML5 application 113 having an ID "ap3". In this case, the origin is "http://127.0.0.3:10000".

The virtual URL is not used for actual access, and it is sufficient for the virtual URL when it follows the format of an URL. That is, the browser engine 111 should just recognize an origin.

According to this embodiment, when causing the browser engine 111 to execute plural HTML5 applications 113 stored therein, a unique origin is assigned to each HTML5 application 113, and it is possible to make each HTML5 application 113 occupy local storage 115. In addition, there is also an aspect in which constraints on real resources such as port conflicts do not arise.

In addition, by preparing plural execution environments 205, when there are plural groups of the HTML5 application 113, it is possible to operate so that a management range 117 is provided for each group and independence of each group is maintained. There is also an aspect that there is no hindrance even when the same virtual URL is used in different management ranges 117.

Embodiment 2

The case in which the browser engine 111 operates according to the same origin policy will be described. In this case, an error occurs when the HTML5 application 113 that is executed by the browser engine 111 accesses an external server 701 other than the provider of that HTML5 application 113. This is because the origin of the provider of the HTML5 application 113 is different from the origin of the request destination. Even if the origins are different in this manner, in order to normally process the request, it is a condition to perform settings for CORS on the external server 701 side.

In this embodiment, an error does not occur even when the CORE setting is not performed in the external server 701. Specifically, an URL of the external server 701 that the HTML5 application 113 is trying to access is diverted to the virtual URL, of that HTML5 application 113. In this way, the origins become the same. An error does not occur when origins are the same.

Therefore, the delivery server 103 sets the URL of a predetermined external server 701 in the metadata of an application package 203 that is stored in the package storage unit 1011.

Figure 19B:
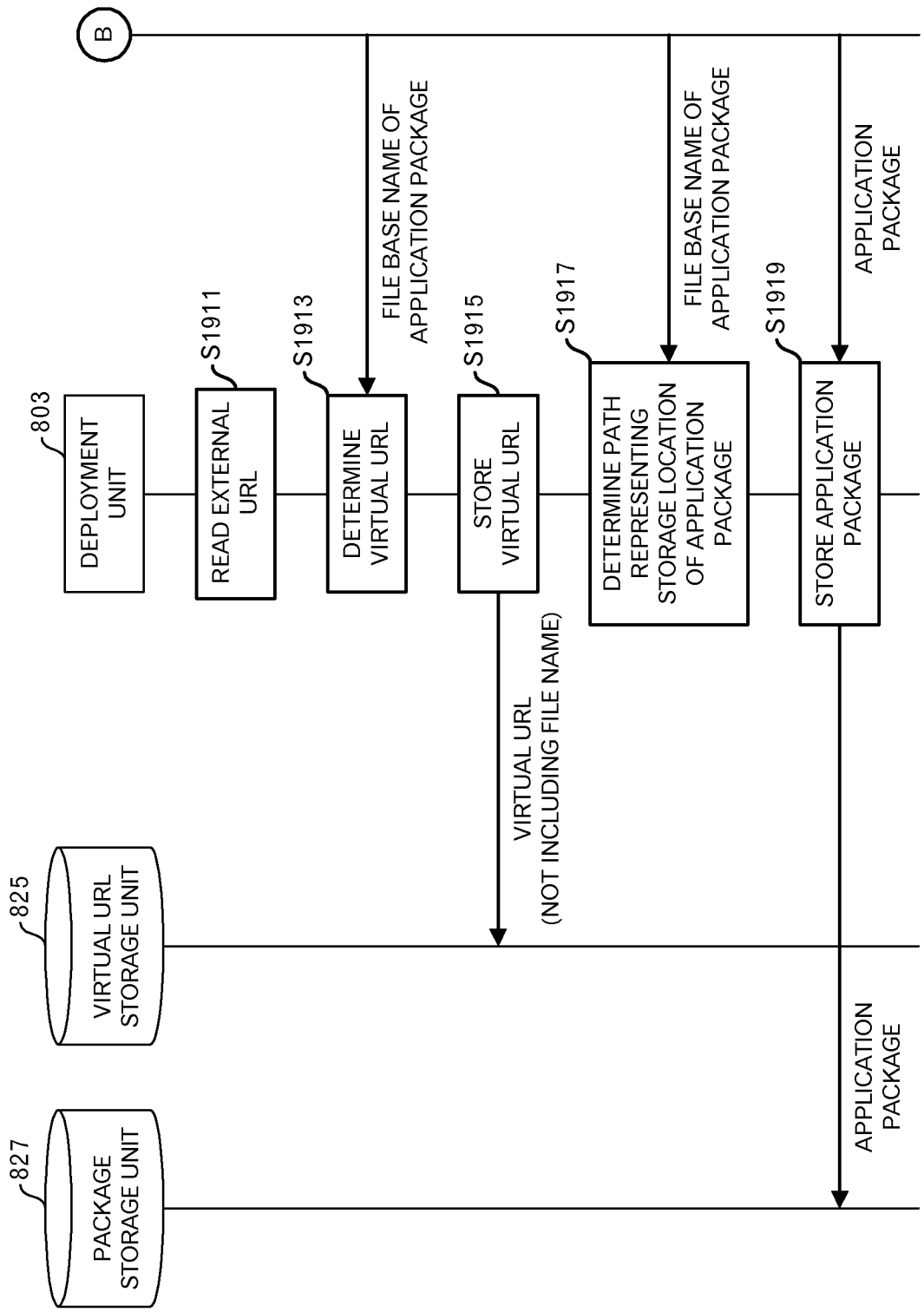
FIG. 19B is a diagram depicting a sequence of the deployment phase in the second embodiment.

FIG. 19A and FIG. 19B illustrate the sequence of the deployment phase in the second embodiment. As in the case of the first embodiment, when the obtaining unit 201 obtains the delivery source URL (S1901), the obtaining unit 201 requests an application package 203 (S1903).

When the delivery unit 1001 of the delivery server 103 receives a request for the application package 203 (S1905), the delivery server 103 sends the application package 203 that includes metadata in which an external URL (for example, "http://www.example1.com") is set (S1907).

The obtaining unit 201 receives that application package 203 (S1909). Processing by the obtaining unit 201 proceeds to that illustrated in FIG. 19B by way of terminal B.

The deployment unit 803 reads an external URL from the metadata of the application package 203 that was received by the obtaining unit 201 (S1911). Then, the deployment unit 803 determines a virtual URL (for example, "http://www.example1.com/app1/") (S1913). Specifically, the virtual URL is determined by adding, to the external URL, a file base name (for example, "app1") of the application package 203 that was obtained by the obtaining unit 201. This virtual URL does not include a file name. The deployment unit 803 writes the virtual URL in the virtual URL storage unit 825 (S1915).

As in the case of the first embodiment, the deployment unit 803 determines a path that represents a storage location of the application package 203 (S1917), and stores the application package 203 (S1919).

The sequence in the provision phase is the same as in the first embodiment. However, in the sequence illustrated in FIG. 16 and FIG. 17, an error does not occur even when the external server 701 does not perform settings for CORS.

According to this embodiment, when accessing a predetermined external resource during execution of an HTML5 application 113, it is possible to avoid an error due to violation of the same origin policy.

Embodiment 3

In the embodiments described above, an origin was distinguished for each HTML5 application 113. In this embodiment, an origin is distinguished for each HTML5 application 113 group. In doing so, it is possible to share local storage 115 by a predetermined group unit.

Specifically, the setting unit 1003 of the delivery server 103 sets a group key beforehand in the metadata of an application package 203. The group key identifies a group that the HTML5 application 113 belongs to. Then, the same origin is set for applications having the same group key.

Figure 20A:
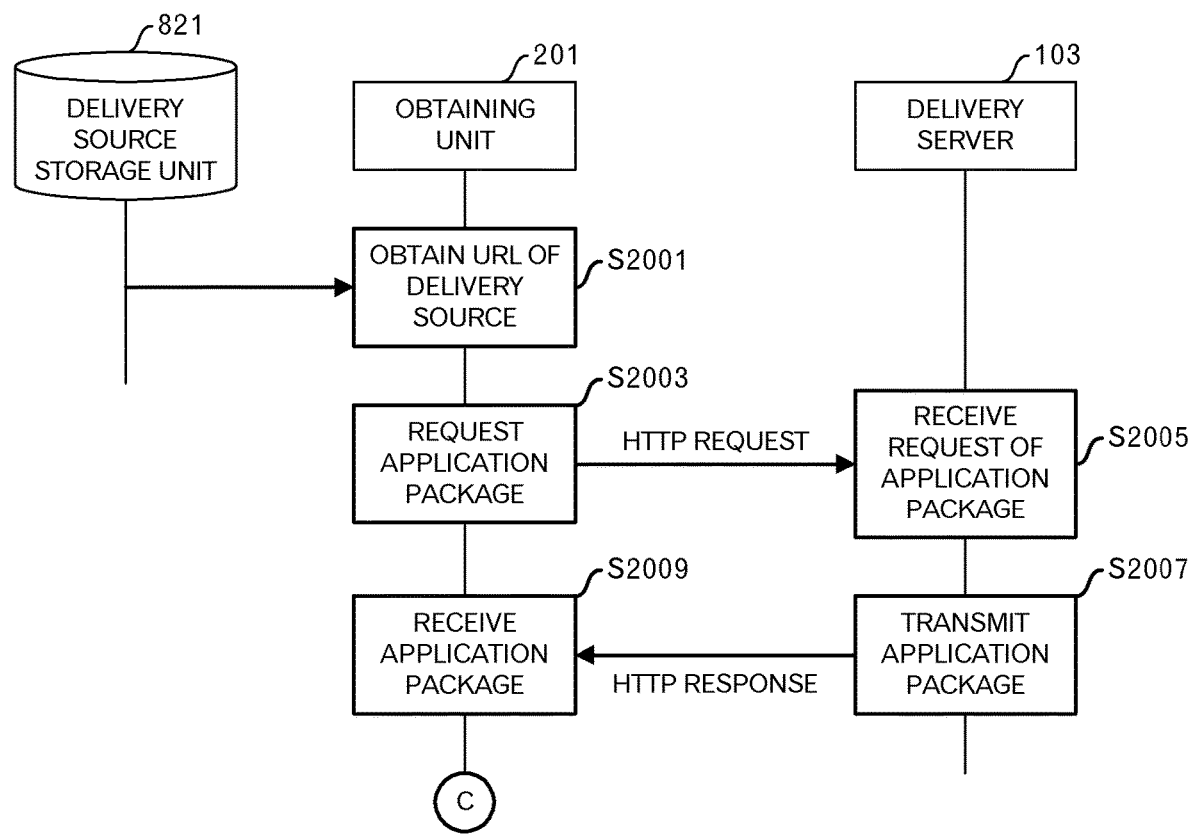
FIG. 20A is a diagram depicting a sequence of the deployment phase in a third embodiment.
Figure 20B:
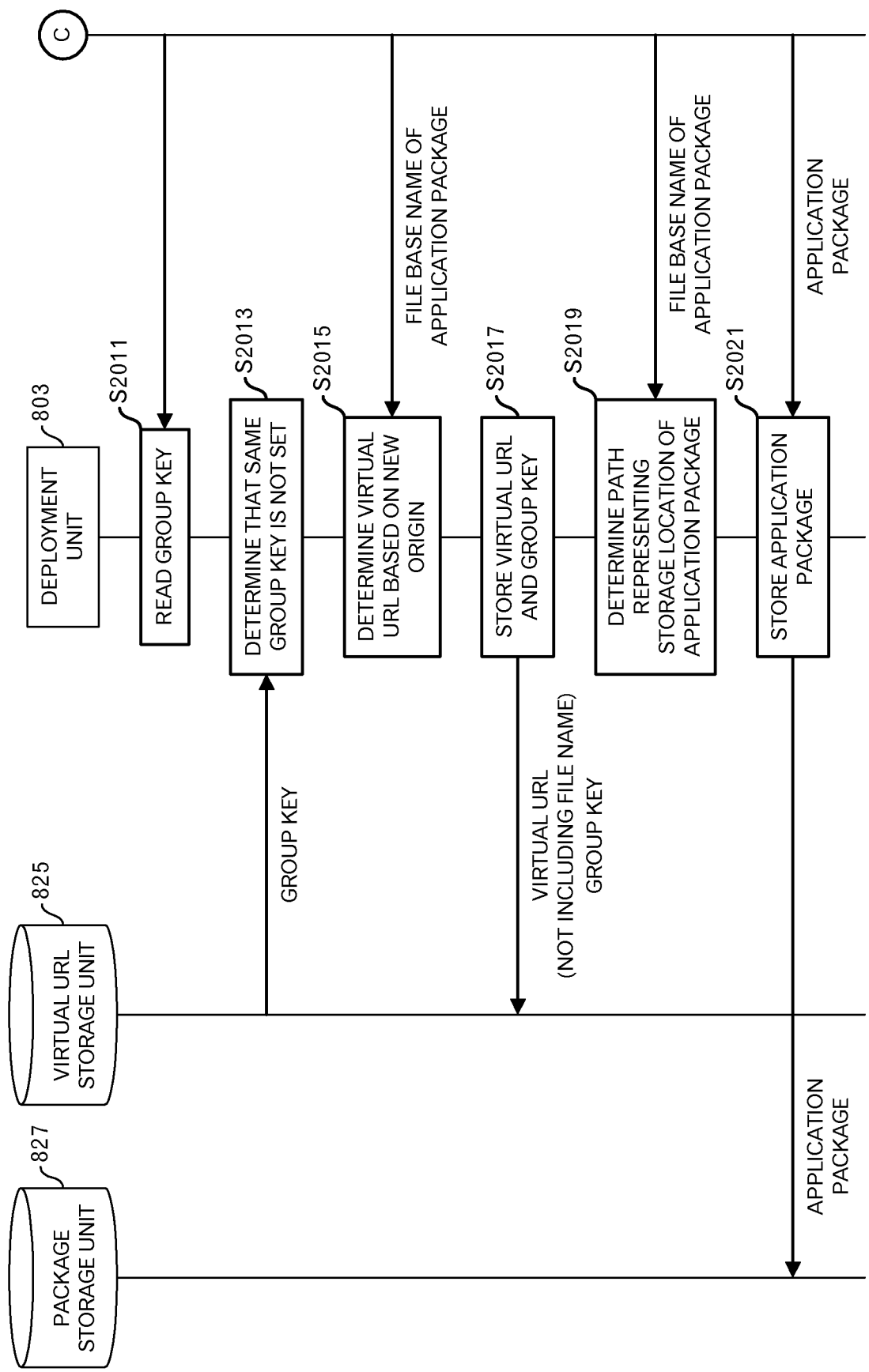
FIG. 20B is a diagram depicting a sequence of the deployment phase in the third embodiment.

FIG. 20A and FIG. 20B illustrate the sequence of the deployment phase of the third embodiment. As in the case of the first embodiment, when the obtaining unit 201 obtains a delivery source URL (S2001), the obtaining unit 201 requests an application package 203 (S2003).

When the delivery unit 1001 of the delivery server 103 receives the request for the application package 203 (S2005), the delivery server 103 transmits the application package 203 that includes metadata in which a group key (for example, "g1") has been set (S2007).

The obtaining unit 201 receives that the application package 203 (S2009). The processing by the obtaining unit 201 proceeds to that illustrated in FIG. 20B by way of terminal C.

The deployment unit 803 reads the group key from the metadata of the application package 203 that was received by the obtaining unit 201 (S2011). Then, the deployment unit 803 determines whether or not the same group key is set in the virtual URL table.

The virtual URL table of the third embodiment will be explained using FIG. 21. The records in the virtual URL table of the third embodiment have another field for setting a group key.

Figures 21, 22A:
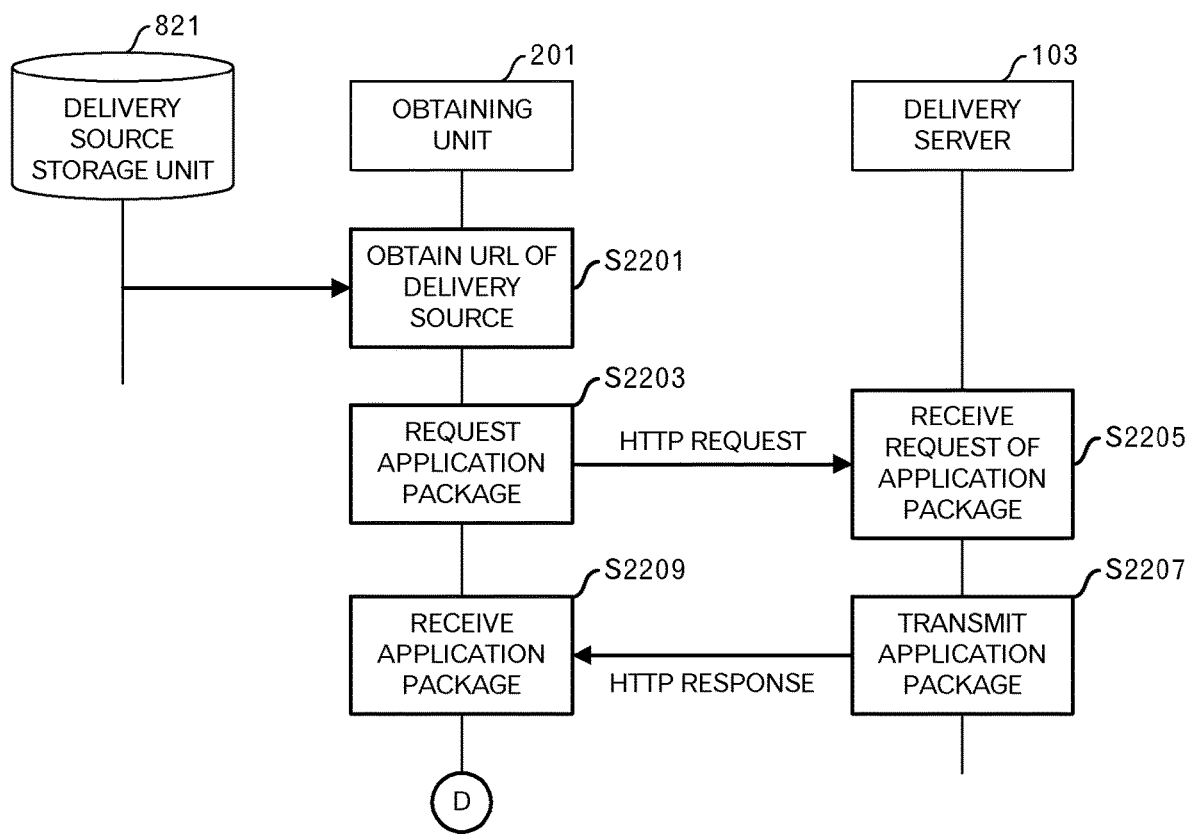
FIG. 21 is a diagram depicting an example of the virtual URL table in the third embodiment.
FIG. 22A is a diagram depicting a sequence of the deployment phase in the third embodiment.

The first record that is illustrated in FIG. 21 represents that the virtual URL "http://0.0.0.0:10001/app1/" is assigned to the HTML5 application 113 having an ID "ap1". Moreover, the first record represents that the HTML5 application 113 belongs to the group that is identified by the key "g1".

Similarly, the second record represents that the virtual URL "http://0.0.0.0:10001/app2/" is assigned to the HTML5 application 113 having an ID "ap2". Moreover, the second record represents that the HTML5 application 113 also belongs to the group that is identified by the key "g1". The origin ("http://0.0.0.0:10001") in this case is the same as in the first record.

Similarly, the third record represents that the virtual URL "http://0.0.0.0:10002/app3/" is assigned to the HTML5 application 113 having an ID "ap3". Moreover, the third record represents that the HTML5 application 113 belongs to the group that is identified by the key "g2". The origin ("http://0.0.0.0:10002") in this case is different than in the first and second records.

The explanation will return to the explanation of FIG. 20B. In this example, it is presumed that no records are provided in the virtual URL table. Therefore, it is determined that the same group key is not set in the virtual URL table (S2013). When the same group key is not set in the virtual URL table, the deployment unit 803 determines a virtual URL based on a new origin (S2015). The method for determining a virtual URL based on a new origin is the same as the method for determining a virtual URL in the first embodiment. The deployment unit 803 then writes the virtual URL and the group key in the virtual URL storage unit 825 (S2017).

As in the case of the first embodiment, the deployment unit 803 determines a path that represents the storage location of the application package 203 (S2019), and stores the application package 203 (S2021). When there is an unknown group key set in the metadata, processing is performed in this way. According to this processing, the first record is provided in the virtual URL table illustrated in FIG. 21.

Figure 22B:
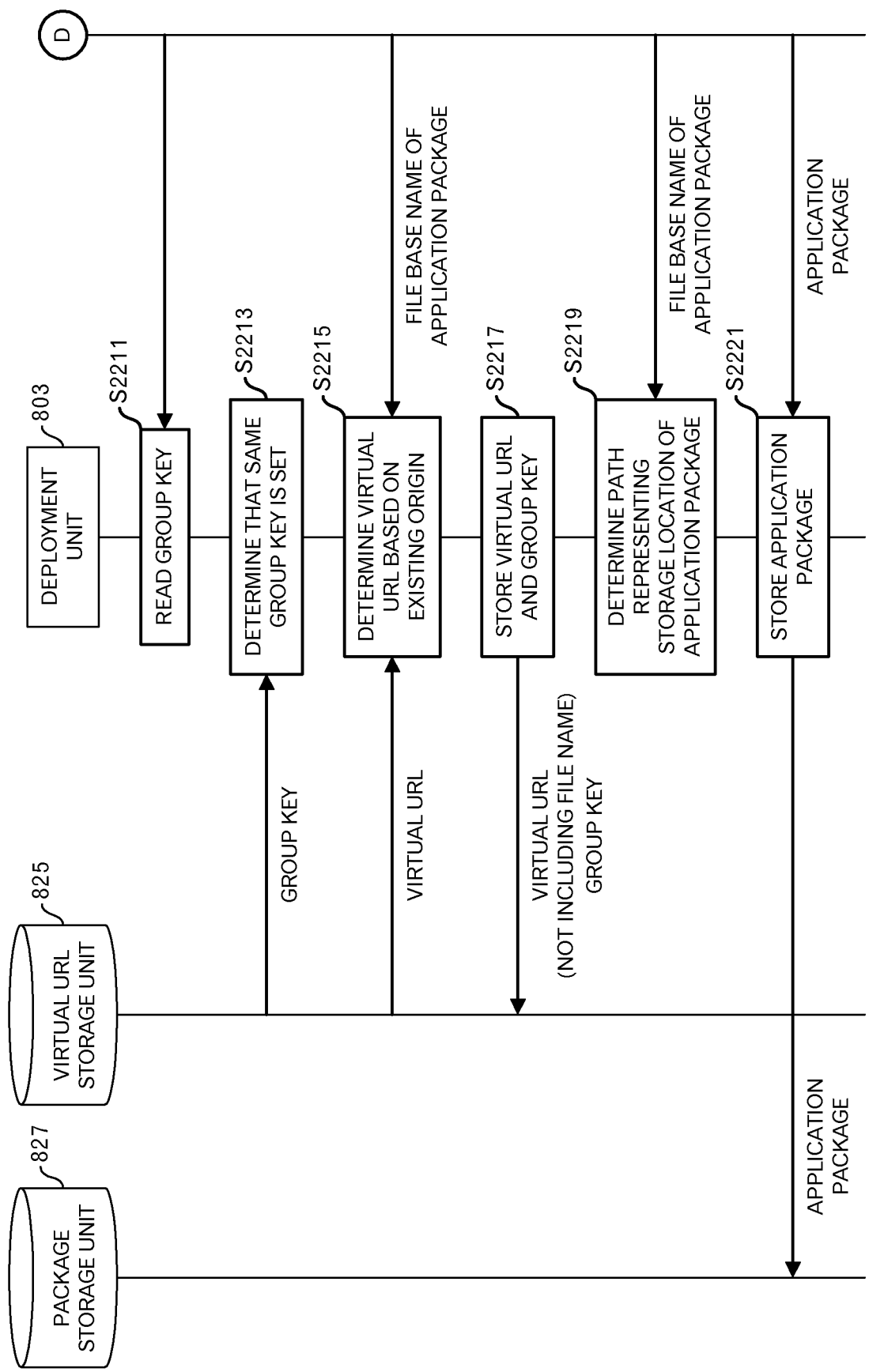
FIG. 22B is a diagram depicting a sequence of the deployment phase in the third embodiment.

Next, processing for the case in which an existing group key has been set in the metadata will be explained using the sequence of the deployment phase, which is illustrated in FIG. 22A and FIG. 22B. As in the case illustrated of FIG. 20A, when the obtaining unit 201 obtains a delivery source URL (S2201), the obtaining unit 201 requests an application package 203 (S2203).

When the delivery unit 1001 of the delivery server 103 receives a request for the application package 203 (S2205), the delivery server 103 transmits an application package 203 that includes metadata in which a group key (for example, "g1") has been set (S2207).

The obtaining unit 201 receives that application package 203 (S2209). The processing by the obtaining unit 201 proceeds to the processing illustrated in FIG. 22B by way of terminal D.

The deployment unit 803 reads the group key (for example "g1") from the metadata of the application package 203 that was received by the obtaining unit 201 (S2211). Then, when the deployment unit 803 determines that the same group key has been set in the virtual URL table (S2213), the deployment unit 803 determines a virtual URL based on an existing origin (S2215). Specifically, the deployment unit 803 reads a virtual URL (for example, "http://0.0.0.0:10001/app1/") from the virtual URL table that corresponds to the group key. Then, a new virtual URL (for example, "http://0.0.0.0:10001/app2/") is determined by adding a file base name (for example, "app2") of the application package 203 to the origin (for example, "http//0.0.0.0:10001") of the read virtual URL.

The deployment unit 803 writes the determined virtual URL and the group key in the virtual URL table (S2217). As in the embodiments described above, the deployment unit 803 determines a path representing the storage location of the application package 203 (S2219), and stores the application package 203 (S2221).

In this example, groups were distinguished according to port numbers. However, it may be possible to distinguish groups according to host names or IP addresses.

FIG. 23 illustrates an example of a virtual URL table when distinguishing groups according to host names. The first record in FIG. 23 represents that the virtual URL "http://g1.com/app1/" is assigned to the HTML5 application 113 having an ID "ap1". Moreover, the first record represents that the HTML5 application 113 belongs to the group that is identified by the key "g1".

Similarly, the second record represents that the virtual URL "http://g1.com/app2/" is assigned to the HTML5 application 113 having an ID "ap2". Moreover, the second record represents that the HTML5 application 113 also belongs to the group that is identified by the key "g1". The origin ("http://g1.com") in this case is the same as that of the first record.

Similarly, the third record represents that the virtual URL "http://g2.com/app3/" is assigned to the HTML5 application 113 having an ID "ap3". Moreover, the third record represents that the HTML5 application 113 belongs to the group that is identified by the key "g2". The origin ("http://g2.com") in this case is different from that of the first and second records.

According to this embodiment, it is possible to share the local storage 115 in group units of HTML5 applications 113. By sharing local storage 115, it is possible to reduce redundant data, and to reduce an amount of data transmitted, for example. Moreover, in one aspect, it helps cooperation between the HTML5 applications 113.

FIG. 24 illustrates a hardware configuration example of the user terminal 101. The user terminal 101 has a processor 2401, a storage unit 2403, an antenna 2411, a wireless controller 2413, an audio controller 2415, a speaker 2417, a microphone 2419, a display 2421, a touch sensor 2423, a camera 2425 and a GPS (Global Positioning System) device 2427.

The processor 2401 may also include a modem CPU (Central Processing Unit) and application CPU. The storage unit 2403 has, for example, ROM (Read Only Memory) 2405, RAM (Random Access Memory) 2407 and flash memory 2409. The ROM 2405, for example, stores preset data and programs. The RAM 2407 includes, for example, an area for loading programs and data for applications and the like. The flash memory 2409 stores, for example, programs for an operating system, applications and the like, and also stores data as needed.

The touch sensor 2423 is, for example, a panel type sensor that is located on the display surface of the display 2421, and accepts touch operations. The display 2421 displays, for example, various screens that are made to be displayed by an application. Specifically, the display 2421 and the touch sensor 2423 are used as an integrated touch panel. A touch operation on the touch sensor 2423 generates a touch event. In addition to a touch sensor 2423, it is also possible to provide keys.

The antenna 2411 receives, for example, wireless data of a cellular system. The wireless controller 2413 controls wireless communication. Voice communication of a telephone and data communication are performed under control of the wireless communication.

The audio controller 2415 performs analog-to-digital conversion and digital-to-analog conversion of audio data. The speaker 2417 outputs analog data as sound. The microphone 2419 converts sound to analog data.

The camera 2425 is used for taking video or photographic images. The GPS device 2427 measures the position.

Although the embodiments of this invention were explained above, this invention is not limited to those. For example, the aforementioned functional block configuration does not always correspond to actual program module configuration.

Moreover, the aforementioned configuration of each storage area is a mere example, and may be changed. Furthermore, as for the processing flow, as long as the processing results do not change, the turns of the steps may be exchanged or the steps may be executed in parallel.

In addition, the aforementioned delivery server 103 is a computer device as illustrated in FIG. 25. That is, a memory 2501, a CPU 2503 (central processing unit), a HDD (hard disk drive) 2505, a display controller 2507 connected to a display device 2509, a drive device 2513 for a removable disk 2511, an input unit 2515, and a communication controller 2517 for connection with a network are connected through a bus 2519 as illustrated in FIG. 25. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform predetermined operations. Moreover, intermediate processing data is stored in the memory 2501, and if necessary, it is stored in the HDD 2505. In these embodiments of this invention, the application program to realize the aforementioned processing is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer device as stated above, the hardware such as the CPU 2503 and the memory 2501, the OS and the application programs systematically cooperate with each other, so that various functions as described above in details are realized.

The aforementioned embodiments are summarized as follows:

An information processing apparatus relating to a first aspect includes a memory and a processor coupled to the memory. And the processor is configured to: instruct a browser engine to load an application based on a virtual URL corresponding to a path of a storage location of the application, the application being stored in a storage unit and to be executed by the browser engine; and provide, to the browser engine, the application identified by the path corresponding to the virtual URL, when receiving, from the browser engine, a request to obtain data using the virtual URL as a proxy.

In this way, when executing plural applications stored therein by the browser engine, a unique origin may be allocated to each application and each application may occupy local storage. In addition, there is also an aspect in which constraints on real resources such as port conflicts do not arise.

Furthermore, the processor may further be configured to generate plural execution environments each of which includes the storage unit, the browser engine, a processing unit for the instructing and a processing unit for the providing.

In this way, when there are plural groups of application, it becomes possible to operate so as to keep independence of each group, by providing an execution environment for each group. In addition, there is no problem even if the same virtual URL is used in different execution environments.

Furthermore, the virtual URL may be a URL of predetermined external resources, which is attached to the application.

In this way, it becomes possible to avoid an error due to violation of the same origin policy when accessing predetermined external resources during execution of an application.

Furthermore, the virtual URL may correspond to a common origin for applications that belong to a same group, which is determined based on a group identification data which is attached to the applications.

In this way, it becomes possible to share local storage by applications in the same group.

An information delivery system relating to a second aspect includes a delivery server and an information processing apparatus. And the delivery server includes a first memory and a first processor coupled to the first memory. And the first processor is configured to deliver an application to which a URL of predetermined external resources is attached. And the information processing apparatus includes a second memory and a second processor coupled to the second memory. And the second processor is configured to: instruct a browser engine to load the application based on a virtual URL corresponding to a path of a storage location of the application, the application being stored in a storage unit; and provide, to the browser engine, the application identified by the path corresponding to the virtual URL, when receiving, from the browser engine, a request to obtain data using the virtual URL as a proxy. And the virtual URL is the URL of predetermined external resources.

An information delivery system relating to a third aspect includes a delivery server and an information processing apparatus. And the delivery server includes a first memory and a first processor coupled to the first memory. And the first processor is configured to deliver an application to which identification data of a group to which the application belongs is attached. And the information processing apparatus includes a second memory and a second processor coupled to the second memory. And the second processor is configured to: instruct a browser engine to load the application based on a virtual URL corresponding to a path of a storage location of the application, the application being stored in a storage unit; and provide, to the browser engine, the application identified by the path corresponding to the virtual URL, when receiving, from the browser engine, a request to obtain data using the virtual URL as a proxy. And the virtual URL corresponds to a common origin for applications that belongs to a same group as the application, the same group being determined based on the group identification data.

An information processing method relating to a fourth aspect includes: instructing a browser engine to load an application based on a virtual URL corresponding to a path of a storage location of the application, the application being stored in a storage unit and to be executed by the browser engine; and providing, to the browser engine, the application identified by the path corresponding to the virtual URL, when receiving, from the browser engine, a request to obtain data using the virtual URL as a proxy.

Incidentally, it is possible to create a program causing a processor to execute the aforementioned processing by the information processing apparatus, and such a program is stored in a computer readable storage medium or storage device such as a flexible disk, CD-ROM, DVD-ROM, magneto-optic disk, a semiconductor memory, and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An information processing apparatus, comprising:
a memory; and
a processor coupled to the memory and configured to:
instruct a browser engine to load an application based on a virtual URL corresponding to a path of a storage location of the application, the application being stored in a storage unit and to be executed by the browser engine, the virtual URL including an origin, and the origin including a port number; and
provide, as a proxy, the browser engine with the application identified by the path corresponding to the virtual URL, when receiving, from the browser engine through a certain socket, a request to obtain data using the virtual URL,
wherein the proxy generates no socket corresponding to the port number included in the origin in the virtual URL, and a local storage to be used by the application is allocated for each origin included in the virtual URL for the application.

2. The information processing apparatus as set forth in claim 1, wherein the processor further configured to generate a plurality of execution environments each of which includes the storage unit, the browser engine, a processing unit for the instructing and a processing unit for the providing.

3. The information processing apparatus as set forth in claim 1, wherein the virtual URL is a URL of predetermined external resources, which is attached to the application.

4. The information processing apparatus as set forth in claim 1, wherein the virtual URL for another application that belongs to a same group as the application includes a same origin as the application.

5. An information delivery system, comprising:
a delivery server; and
an information processing apparatus, and
wherein the delivery server comprises:
a first memory; and a first processor coupled to the first memory and configured to deliver an application to which a URL of predetermined external resources is attached, the information processing apparatus comprises:
  a second memory; and
  a second processor coupled to the second memory and configured to:
    instruct a browser engine to load the application based on a virtual URL corresponding to a path of a storage location of the application, the application being stored in a storage unit, the virtual URL including an origin, and the origin including a port number; and
    provide, as a proxy, the browser engine with the application identified by the path corresponding to the virtual URL, when receiving, from the browser engine through a certain socket, a request to obtain data using the virtual URL, and
  the virtual URL is the URL of predetermined external resources, the proxy generates no socket corresponding to the port number included in the origin in the virtual URL, and a local storage to be used by the application is allocated for each origin included in the virtual URL for the application.

6. An information delivery system, comprising:
a delivery server; and
an information processing apparatus, and
wherein the delivery server comprises:
  a first memory; and
  a first processor coupled to the first memory and configured to deliver an application to which identification data of a group to which the application belongs is attached, the information processing apparatus comprises:
  a second memory; and
  a second processor coupled to the second memory and configured to:
    instruct a browser engine to load the application based on a virtual URL corresponding to a path of a storage location of the application, the application being stored in a storage unit, the virtual URL including an origin, and the origin including a port number; and
    provide, as a proxy, the browser engine with the application identified by the path corresponding to the virtual URL, when receiving, from the browser engine through a certain socket, a request to obtain data using the virtual URL, and
  the proxy generates no socket corresponding to the port number included in the origin in the virtual URL, and a local storage to be used by the application is allocated for each origin included in the virtual URL for the application, and
  the virtual URL for another application that belongs to a same group as the application includes a same origin as the application, and the same group is determined based on the group identification data.

* * * * *